(12) United States Patent
Kim

(10) Patent No.: US 11,366,003 B1
(45) Date of Patent: Jun. 21, 2022

(54) METHOD AND APPARATUS FOR AN ABSOLUTE PRECISION LOAD GAUGE

(71) Applicant: Kwang Yul Kim, Ithaca, NY (US)

(72) Inventor: Kwang Yul Kim, Ithaca, NY (US)

( * ) Notice: Subject to any disclaimer, the term of this patent is extended or adjusted under 35 U.S.C. 154(b) by 98 days.

(21) Appl. No.: 16/573,603

(22) Filed: Sep. 17, 2019

Related U.S. Application Data

(60) Provisional application No. 62/732,612, filed on Sep. 18, 2018, provisional application No. 62/799,398, filed on Jan. 31, 2019, provisional application No. 62/766,623, filed on Mar. 22, 2019.

(51) Int. Cl.

| | |
|---|---|
| *G01G 3/12* | (2006.01) |
| *G01G 3/16* | (2006.01) |
| *G01G 3/18* | (2006.01) |
| *G01L 1/10* | (2006.01) |
| *G01N 29/07* | (2006.01) |
| *G01G 23/01* | (2006.01) |
| *G01G 23/48* | (2006.01) |
| *G01G 9/00* | (2006.01) |

(52) U.S. Cl.
CPC ............ *G01G 3/12* (2013.01); *G01G 3/16* (2013.01); *G01G 3/18* (2013.01); *G01G 23/01* (2013.01); *G01G 23/48* (2013.01); *G01G 9/00* (2013.01); *G01L 1/10* (2013.01); *G01N 29/07* (2013.01)

(58) Field of Classification Search
CPC ............ G01G 3/12; G01G 3/16; G01G 3/165; G01G 3/18; G01G 9/00; G01G 23/48; G01G 23/01; G01N 29/227; G01N 29/07; G01N 29/14; G01L 1/10
See application file for complete search history.

(56) References Cited

U.S. PATENT DOCUMENTS

| | | | | |
|---|---|---|---|---|
| 4,522,071 A | * | 6/1985 | Thompson | G01N 29/07 73/597 |
| 4,601,207 A | * | 7/1986 | Steblay | G01N 29/07 405/259.1 |
| 5,004,059 A | * | 4/1991 | Webster | G01L 1/255 177/210 R |
| 5,016,200 A | * | 5/1991 | Passarelli | G01G 9/00 177/136 |
| 5,170,366 A | * | 12/1992 | Passarelli | G01G 9/00 702/41 |
| 6,424,922 B1 | * | 7/2002 | Bray | G01L 1/255 702/42 |
| 6,477,473 B2 | * | 11/2002 | Bray | G01L 1/255 702/42 |

OTHER PUBLICATIONS

The Theory of Themodynamic-Acoustoelelastic Stress Guage; Kwang Yul Kim and Wofgnig Sachse Journal of Applied Physics 80, 4934 (1996).

(Continued)

*Primary Examiner* — Randy W Gibson
(74) *Attorney, Agent, or Firm* — Raudall L. Reed

(57) ABSTRACT

A method, apparatus and system are disclosed for the measuring directly in units of force or mass huge load of form 10 to 1000 tons or more. The system includes a unique load carrying member to which the huge load is applied and based on readings of three types of ultrasonic waves and the change in the dimensions of the load carrying member it is able to directly calculate the force in units of newtons or units of mass in kilograms of the applied load.

11 Claims, 11 Drawing Sheets

(56) References Cited

OTHER PUBLICATIONS

Nonlinear Elastic Equaiton of State of Solids Subjected To Uniaxial Homogeneous Loading; Kwang Yul Kim and W. Sachse Journal of Material Science, 35 (2000) 3197-3205.
Thermodynamics at Finite Deformation of an Anisotropic Elastic Solid; Kwang Yul Kim Physical Review B, vol. 54, No. 9 (Sep. 1, 1996—I).

* cited by examiner

306

Start APLGMS-CalcLoad by recalling MATLAB Program CAlbFree_LoadCell.

a. Calculate the cross-sectional area $A_a$ of LCM by
   $A_a = A_r [1+2\text{Alpha} \times (T_a - T_r)]$.

b. Calculate the lateral acoustic path length $La1$ of LCM by
   $La1 = Lr [1 + \text{Alpha}(T_a - T_r)]$.

c. Calculate the density $\rho_a$ by $\rho_a = \rho_r [1 + 3\text{Alpha}(T_a - T_r)]^{-1}$.

d. Calculate SOECS $C_{11}^S = \rho_a \times W_L^2$, $C_{44}^S = \rho_a \times (W_{21}^2 + W_{31}^2)/2$.
   For an isotropic solid at zero load. $C_{12}^S = C_{11}^S - 2C_{44}^S$.

e. From the inverse of $[C_{ij}^T]$ matrix, find $S_{ij}^T$. Find SOECC $S_{11}^T$
   $= 1/E(a)$, Poisson's ratio $= -S_{12}^T/S_{11}^T$.

f. Calculate thermal parameters $Z_1, Z_2, Z_3,$ and $Z_4$ (See Eqs. 11a and 11b) from the knowledge of $S_{11}^T, S_{12}^T, \Delta$ and temperature derivatives of $S_{11}^T$ and $S_{12}^T$, found in the literature g. Calculate the quantities $Ea, Eb, Ec, Ed, Ee,$ and $Ef$ (See Eqs. 13b-13g).

h. Calculate the quantities $g$ and $h$ (See Eq. 16)

i. Calculate the thermodynamics stress $\tau_{33}$ from the equation
   $(gE_d + hE_e + 2gE_f)\tau_{33}^2 + (S_{12}^T - gE_a - hE_b - 2gE_c)\tau_{33} + (\lambda_1^2 - 1)/2 = 0$ j. Calculate $C_{111}^T, C_{112}^T,$ and $C_{123}^T$. (See Eq. 14).

k. Calculate $S_{111}^T$ (See Eq. 17).

m. Calculate the vertical principal strech $\lambda_3$ and Cauchy stress $\sigma_{33}$. (See Eq. 18).

n. Finally Calculate applied load $P$ (See Eq. 18).

FIG. 8B

METHOD AND APPARATUS FOR AN ABSOLUTE PRECISION LOAD GAUGE

CROSS REFERENCE TO RELATED APPLICATIONS

This application claims the benefit of priority under the applicable laws of the United States of: U.S. Provisional Application Ser. No. 62/732,612 filed on Sep. 18, 2018 entitled Design and Construction of an Absolute Load Gauge, and U.S. Provisional Application Ser. No. 62/799,398 filed on Jan. 31, 2019 entitled Method and Apparatus of an Absolute Precision Load Gauge, U.S. Provisional Application Ser. No. 62/766,623 filed on Mar. 22, 2019 entitled Method and Apparatus of an Absolute Precision Load Gauge, the contents of which are relied upon and incorporated herein by reference in their entirety.

TECHNICAL FIELD

The disclosure relates generally to a method, system, theory, and apparatus for measuring large load that in some instances can be classified as mega loads or weights. In a more specific aspect of the invention it provides a system, apparatus, theory, and method for precisely measuring loads or the weight of an object directly in units of force or mass with an error of less 0.1%.

BACKGROUND

Measuring applied loads of a solid object over 10 metric tons to over 1000 metric tons is a challenging technology. In this heavy load range it is impractical to compare the applied load with the dead weight, which yields directly the applied load in force units of newton or kg. Most of the commercially available load cells are based on some sorts of arranged strain gages attached on the surface of a load carrying member and their outputs are amplified electrical quantities in proportion to the applied load. Therefore, the strain-gage based load cells are usually calibrated against the dead weight to know their real outputs. These load cells also drift with time and so they should be occasionally calibrated. Calibration could be expensive and difficult in the force range higher than one mega newton. Other type of load cells based on displacement, such as a proving ring and linear variable differential transformer (LVDT), etc., also need to be calibrated, because their outputs are not in units of force or mass. The load cells based on torque or moment also require calibration because of the same reason. At present it appears there is no load cell or load gauge that directly outputs the applied load in units of force or mass.

SUMMARY

Thus, it is an objective of the present invention to provide a system, apparatus and method to measure loads directly in units of force or mass. It is an objective of the present invention to provide a system, apparatus, theory and method that eliminates the need to calibrate against a known dead weight. It is also an objective to provide a system, apparatus and method that can measure dead weights in excess of a few metric tons and in fact measure dead weights of up to 1,000 metric tons or more.

These and other objectives are achieved by providing new theoretical formulations, (which are later explained in detail below) and a method of measuring enormous loads directly in units of mass or force having the steps of: a) providing a load carrying member (LCM) capable of carrying large loads without undergoing plastic deformation; b) taking the following readings while there is a zero load on the LCM: i) recording an ambient temperature, ii) measuring the lateral dimensions and cross-sectional area of the LCM, iii) measuring round trip travel times of three types of ultrasonic waves through an interior of the LCM between opposite lateral flat surfaces of the LCM; c) applying a load to be weighed to the LCM and taking the following readings: i) recording an ambient temperature; ii) measuring lateral dimensional changes of the LCM; iii) measuring round trip travel times of three types of ultrasonic waves through an interior of the LCM between opposite lateral flat surfaces of the LCM; d) during steps b) and c), three types of the ultrasonic waves are: longitudinal, vertically polarized shear and horizontally polarized shear waves, all propagating in the horizontal lateral direction perpendicular to the vertical loading direction 3 and accounting for potential ambient temperature change and; e) calculating a force or mass of the applied load with an Absolute Precision Load Gauge Algorithm (APLGA) built on basis of the developed new theory with measurements taken b) and c) above.

In a further aspect of the invention the method of the step of accounting for potential ambient temperature changes is selected from one of the following options: a) maintaining the load carrying-member at a constant ambient temperature, and b) providing a zero reference member that is substantially the same as the load-carrying member and making the zero reference load member subject to the same ambient temperature as the load-carrying member, keeping the zero reference member at a zero load at all time during the measuring process and subtracting dimensional changes of the zero reference load member from that of the load-carrying member. In a further aspect of the invention the step of calculating the load with the APLGA comprises: a) calculating $\tau_{33}$ thermodynamic stress; and b) calculating the load using $P = A_a \lambda_3 \tau_{33}$, where $A_a$ is the zero load cross sectional area of the load carrying member, and $\lambda_3$ is the vertical principal stretch.

In another aspect of the invention it provides a load carrying member for use in directly measuring a large load in units of force and mass made of a) a material that is: i) isotropic or nearly isotropic at a zero load state; ii) able to bear a load to be measured up to the elastic limit before yielding to plastic deformation; b) structurally a portion of the column of the load carrying member (LCM) with its entire cross-section exhibiting uniform stress distribution when a load is applied to it.

In another aspect of the invention the load-carrying member's length is long enough so that a midsection of the load-carrying member will have uniform stress when a load is applied to the load-carrying member. These dimensions can be varied. By way of example and depending on the application the LCM's length could be 360 mm and its width is 122.6 mm.

In a further aspect of the invention the load-carrying member is cylindrically shaped with four flat surfaces running up and down the length of the load-carrying member each flat surface positioned so that is parallel to the flat surfaces on the opposite side of the load-carrying member and its plane is 90° to a plane of the two adjacent flat surfaces. In further aspect of the invention the load-carrying member can be made from: fused quartz, 7075 Aluminum alloy or (001) oriented silicon.

In additional aspects of the invention it provides: a) A single transducer or two or three separate ultrasonic transducers can be adopted to launch three types of ultrasonic waves to the load carrying member (LCM); b) a single linear encoder digital displacement probe is in contact with the lateral flat side of the load carrying member to measure the lateral dimensions of the LCM both at zero load and under load; and c) the zero reference member is employed to compensate for the dimensional changes of the LCM due to the drifts of the ambient temperatures. Additionally, the following types of transducers can be used among others: contact type piezoelectric transducers and non-contact type electromagnetic acoustic transducers (EMAT).

In yet another aspect of the system of the invention it includes a computer operatively connected to the three ultrasound transducers and a single linear probe, and the computer is programmed to measure a load applied to the load-carrying member based on readings obtained by the three ultrasonic transducers capable of generating three types of ultrasonic waves, and the a single linear displacement probe.

In yet a further aspect of the invention the system computer is programmed with an Absolute Precision Load Gauge Algorithm (APLGA) to compute the load based on the readings obtained by three piezoelectric transducers and a temperature compensated linear displacement probe. A variation as discussed below uses a single ultrasonic EMAT transducer and a single linear displacement probe.

In yet another aspect of the system of the invention the apparatus for dealing with potential ambient temperature changes is selected from one of the following possible options: a) a system to maintain the ambient temperature unchanged, and b) a zero reference load member positioned so that it is subjected to the same ambient temperature changes to which the load-carrying member may be subject, and an apparatus to subtract dimensional changes of the zero reference load member from those of the load carrying member. In a further aspect of the system of the invention a single ultrasonic transducer, such as a dual mode electromagnetic acoustic transducer (EMAT) can generate: a vertically polarized ultrasound shear wave, a horizontally polarized ultrasound shear wave, and a longitudinal ultrasound wave.

The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 8B is a continuation of the flow chart of FIG. 8A;

DETAILED DESCRIPTION

Figure 1:
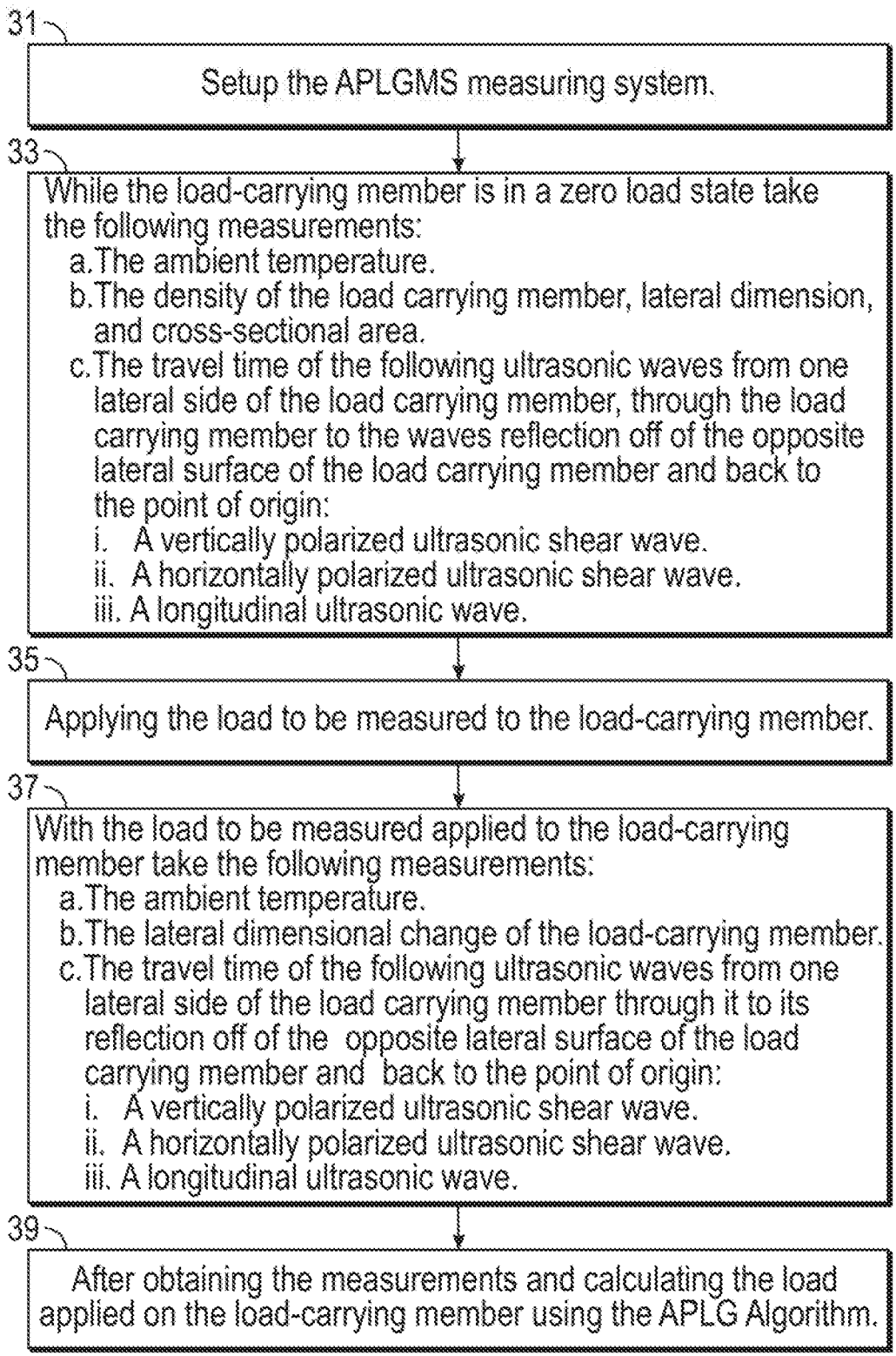
FIG. 1 is a flow chart of the overall method of the present invention.

Overview of the System, Apparatus and Method

The present invention, the Absolute Precision Load Gauge (APLG), provides a method, system, theory, and apparatus for measuring an applied load directly in units of force—newtons or mass—kilograms or any other acceptable units of force or mass. (At some points in this specification, in particular equations for calculating, the applied load will be represented by the capital P.) The invention or inventions use among other things a unique algorithm developed by the inventor and an apparatus developed by the inventor which includes a unique load-carrying member. As will be discussed in detail below, specific measurements are taken of the load carrying member without a load applied to it, while it is in the zero load state. Then the load or object to be weighed is applied to the load-carrying member and the same measurements are taken. With the results obtained the applied load in units of force or mass is calculated for the load or object being measured using an Absolute Precision Load Gauge Algorithm (APLGA), a unique algorithm developed by the inventor. One of the unique and important features of the system, apparatus, theory, and method is that it can be used to measure loads that are well over 10 metric tons, loads that in fact can range up to a few thousand metric tons or more. As noted above and be discussed below in detail it does this by measuring changes in various parameters in the load-carrying member between a zero load state and then a fully loaded state when the load-carrying member is subjected to the full load or weight of the object being weighed. In this disclosure one of the key elements of the invention as the "load carrying member", this will be described in detail below. In referring to it we will use its full name load carrying member or using the acronym "LCM".

In this disclosure we will be referring to the quantity measured as the "load" or the "applied load". Load in engineering sense means force(s) acting on an object or structure and are expressed in units of newton, which is a unit of force. Mass of an object is equal to the density of the object times its volume and is a measure of inertia and expressed in units of kilogram. When mass is multiplied by the gravitational constant 9.806 m/s$^2$, it becomes weight, which is expressed in units of force (newton). Mass and weight are usually used interchangeably, because they can be converted by using the gravitational constant. We measure our body weight in a scale which expresses our body weight in units of mass, such as kilogram or pound, by using the conversion factor, gravitational constant. A floating mass or weight is not a load, but becomes a load on an object when the mass sits on or pulls the object. In addition to mass/weight, load can be generated by many other means, which include pushing, pulling, shoving the object. In a tensile or compression machine, load is generated not by the mass/weight but by a pulling or pushing the object. Pulling or pushing the object is a force generated by the tensile or compressive machine. In this case we cannot use the phrase "weighting the load or weight of the load". We can instead properly use the phrase "measure or determine the (applied) load".

As noted the invention uses unique formulas developed by the inventor to calculate the applied load. The calculations by the unique formulas are based on the following measurements:

1) The speed or travel time of three ultra sound waves that are transmitted through the load carrying members, reflect off the opposite surface of the load-carrying member and travel back to the source transducer, namely: a) a longitudinal wave, b) horizontally polarized shear wave, and c) a vertically polarized shear wave. All three waves propagate perpendicular to the direction of the applied load and are taken when the load-carrying member has a zero load and is subject to the applied load to be measured.

2) The lateral dimensional change of the load-carrying member as a result of the uniaxial force of the applied load.

3) The density, the lateral dimension, and the cross-sectional area of the load-carrying member in the zero load state, the plane of the cross-sectional area being normal to the direction of the uniaxial load when applied.

The three ultrasonic waves are generated by ultrasonic transducers. Among the types of transducers that can be used to generate the waves includes but are not limited to: i) contact-type piezoelectric longitudinal and shear transducers, ii) non-contact type electro-magnetic acoustic transducers (EMATS), and iii) high-intensity laser irradiation and detection methods.

The lateral dimensional change caused by the applied load to the load-carrying member can be measured by, among other systems: i) A non-contact type of laser interferometric system, or ii) A linear optical encoder displacement probe, which is a contact type of system with a resolution of 50 nm.

For the most accurate measurements the system works best when the load-carrying member is initially an isotropic solid at a zero load with a high acoustoelastic constant. An example of such a material is amorphous fused quartz. A highly accurate LCM of the APLG that can be extended to a cubic single crustal, such as silicon with a low density. The LCM in the present invention can also be made of a material that possesses nearly isotropic but slightly transverse isotropic symmetry. 7075 aluminum alloy is such a material of which the load-carrying member can be fabricated. Aluminum alloy 7075's advantages include a low density and a high acoustoelastic constant. Also, it can be easily fabricated in the form and structure for its use as a load-carrying member. The load-carrying member must also able to bear the load being measured without undergoing plastic deformation. Amorphous fused quartz, cubic silicon, and aluminum 7075 can bear such heavy before yielding to plastic deformation. As will be discussed elsewhere herein aluminum 7075 of 123 mm diameter can bear up to 480 metric tons without undergoing plastic deformation.

Because of the need for high sensitivity and resolution in the measurement of the dimensional change of the load-carrying member it must be maintained at a constant temperature or at least account for potential temperature changes. Providing an environment for the load-carrying member of a constant ambient temperature or accounting for changes in temperature can be accomplished in a number of ways. One such way is to isolate the load-carrying member in an environment where the temperature is kept constant during the process of taking the various necessary measurements. However, another alternative is to have a second substantially identical zero reference load member, which is substantially the same as the load carrying member, but is kept load free and adjacent to the load-carrying member to which the load to be measured is applied and thus both the zero reference load member and the actual load-carrying member are subject to the same temperature change. In such a dual setup, changes in the zero reference load member's dimensions are simultaneously recorded by appropriate means, such as a linear encoder displacement probe. The output from the device reading the dimensions on both the actual and the zero reference load members is combined in real-time in subtraction mode so that the outputs of the displacement probes due to temperature change or drift are nulled or compensated, to thereby correct for any temperature change.

FIG. 1 provides a flow chart of the overall method of the present invention. The first step is to setup of the Absolute Precision Load Gauge Measuring System [APLGMS] 31. The details regarding the system are discussed below. Then the following measurements are taken while the load-carrying member is load free: a) the ambient temperature, b) the density of the load carrying member, lateral dimension and cross-sectional area, c) The travel time of the following three types of ultrasonic waves from one lateral side of the load carrying member through its interior of the load carrying-member to its reflection off of the opposite lateral side of the load carrying member back to the point of origin: i) a vertically polarized ultrasonic shear wave, ii) horizontally polarized ultrasonic shear wave, and iii) a longitudinal ultrasonic wave 33. Next the load to be measured is applied to the load-carrying member 35. With the load to be measured, which has been applied to the load-carrying member, taking the following measurements: a) the lateral dimensions of the load-carrying member, b) the travel time of the following three types of ultrasonic waves from one lateral side of the load carrying member through the load-carrying member to its reflection off of the opposite lateral surface of the load carrying member back to the point of origin: i) a vertically polarized ultrasonic shear wave, ii) horizontally polarized ultrasonic shear wave, and iii) a longitudinal ultrasonic wave 37. Finally, after obtaining the above measurements calculating the load applied to the load-carrying member using the APLGA algorithm 39. The APLGA algorithm will be derived and discussed in detail below.

A Detailed Description of the System, Apparatus and Method

Figure 2:
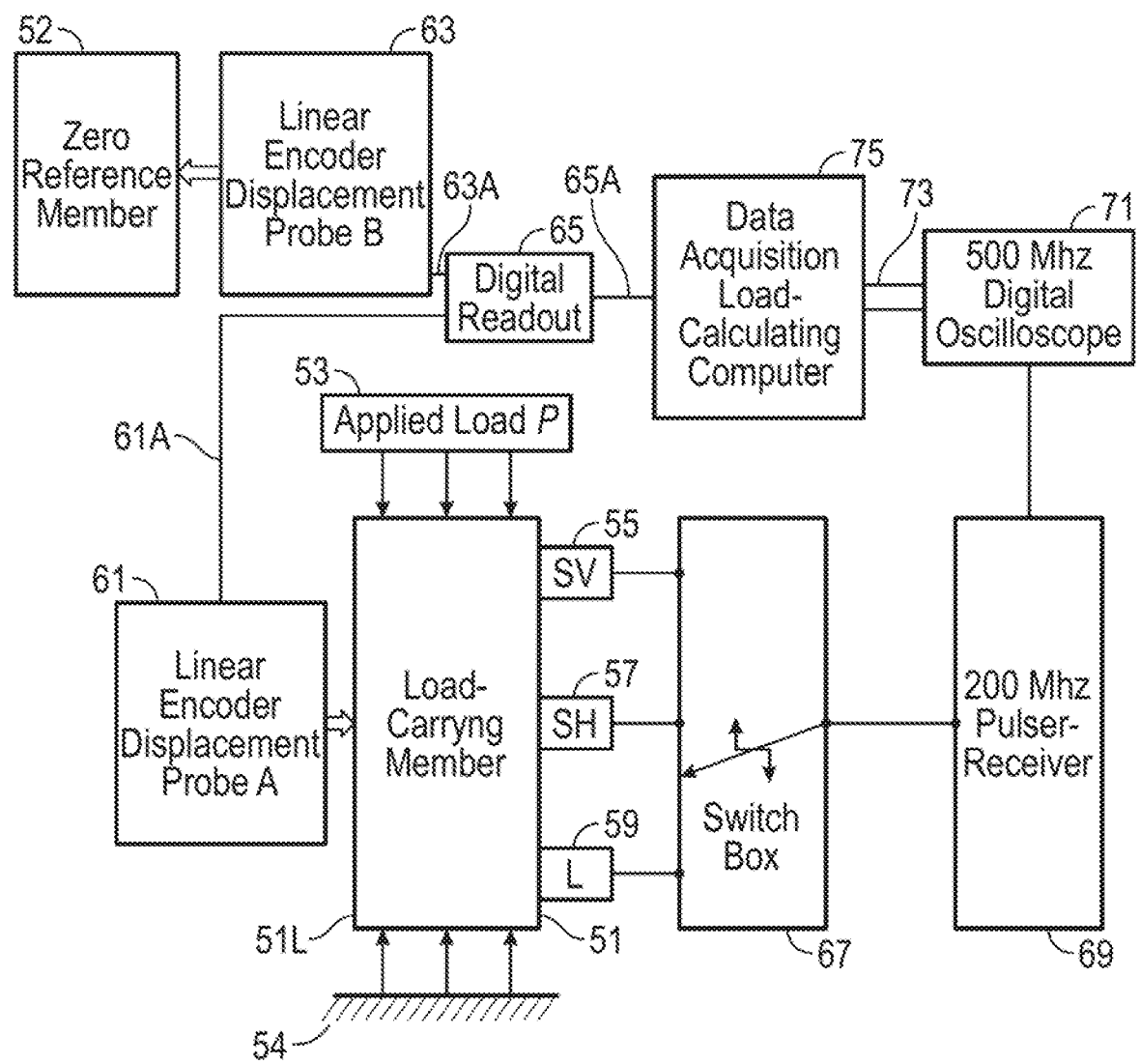
FIG. 2 is schematic diagram of an example of the functional parts of an embodiment the system of the present invention.

FIG. 2 provides a schematic diagram of an example of a system and apparatus that can be used to obtain the necessary measurements to calculate the applied load. In FIG. 2, the load-carrying member is 51, the load to be measured is 53, and the base upon which the load-carrying member sits is 54. 55 is a vertically polarized ultrasonic shear wave transducer, 57 is a horizontally polarized ultrasonic shear wave transducer and 59 is a longitudinal ultrasonic transducer. 61 is a linear displacement probe, 52 is a load-free member the dimensions of which are almost identical to load-carrying member 51 and 63 is a linear displacement probe similar to probe 61. 67 is a switch box that activates transducers 55, 57, and 59. Switch box 67 connects to pulse-receiver 69 which, in turn, connects to digital oscilloscope 71. Oscilloscope 71 connects to computer 75 by GPIB bus 73. Both linear displacement probes 61 and 63 connect to digital read out 65, which in turn, connects to computer 75.

Load-carrying member 51 is the key to the entire system and method. As noted, the load-carrying member can be fused quartz, aluminum 7075, or materials with similar properties. Because of its properties and ease of fabrication, aluminum 7075 is used in the embodiment of the invention described herein.

Figure 3:
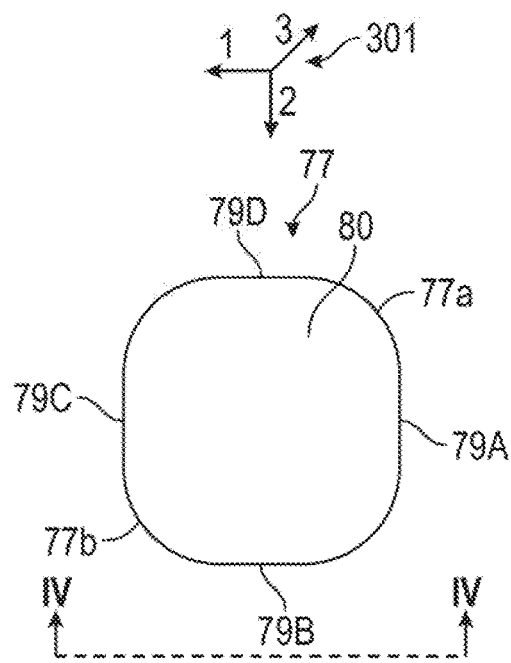
FIG. 3 is a view of the top of an embodiment of a load-carrying member of the present invention.
Figure 4:
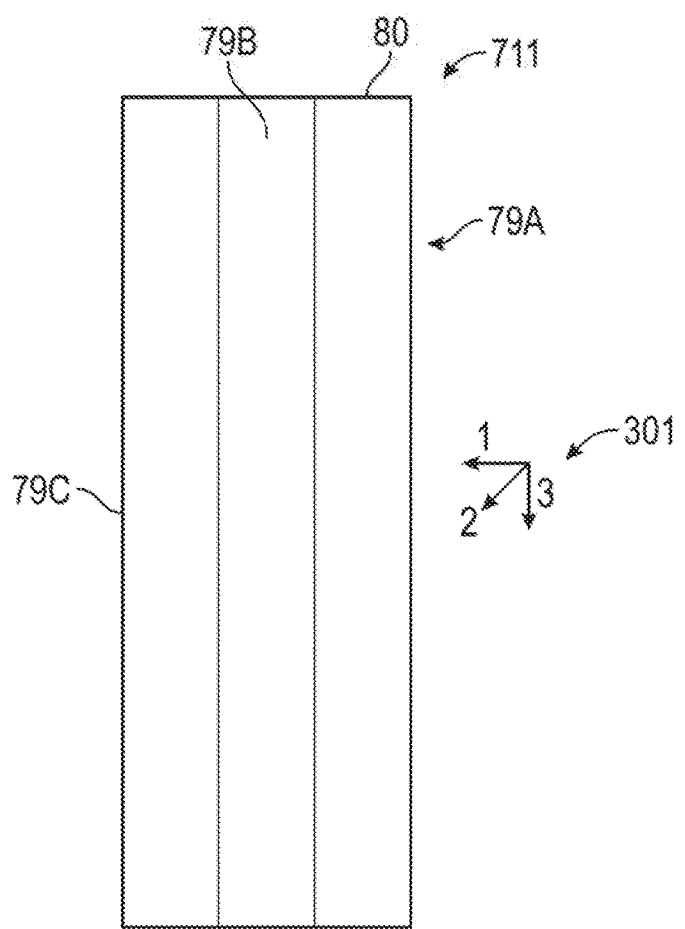
FIG. 4 is a front view of a load carrying member depicted in FIG. 3 from perspective IV-IV.

FIG. 3 is a top view of load-carrying member 77 made of aluminum 7075 and FIG. 4 is a side view along line IV-IV of FIG. 3 of load-carrying member 77. High-strength load-carrying member made of 7075 aluminum alloy is 122.61 mm across from point 77A to 77B. Referring to FIG. 4, load-carrying member 77 is 360 mm high.

Referring back to FIG. 3, load-carrying member 77 has four flat surface side walls 79A, 79B, 79C, and 79D. In the embodiment depicted each side wall is 19 mm wide, as viewed from the top in FIG. 3 and extends from the top to the bottom of load-carrying member 77. The plane of each side wall is at 90° to the adjacent side walls plane. For example, the plane of sidewall 79B is at 90° to the planes of sidewalls 79A and 79C. The plane of each side wall is parallel to the opposite site wall. Thus, the plane of side wall 79B is parallel to the plane of side wall 79D, and the plane of side wall 79A is parallel to the plane of side wall 79C. One of the advantages of using aluminum 7075 for load-carrying member 77 is that it has a yield stress of over 420 MPa and thus, can be loaded with up to 480 metric tons without undergoing plastic deformation with 123 mm cross-sectional diameter. In some of the text and equations below reference is made to directions of (1, 2, 3), these refer to Cartesian coordinates used to distinguish direction with respect to the LCM. Referring to FIG. 3 301 depicts in Cartesian coordinates the directions. As depicted there direction 3 is perpendicular to the top 80 of LCM 77, direction 1 is horizontal and direction 2 is vertical. Referring to FIG. 4 Cartesian Coordinate indicator 301 direction 1 is still horizontal, direction 2 is perpendicular to the plane of the page and direction 3 is perpendicular to top 80.

Figure 5:
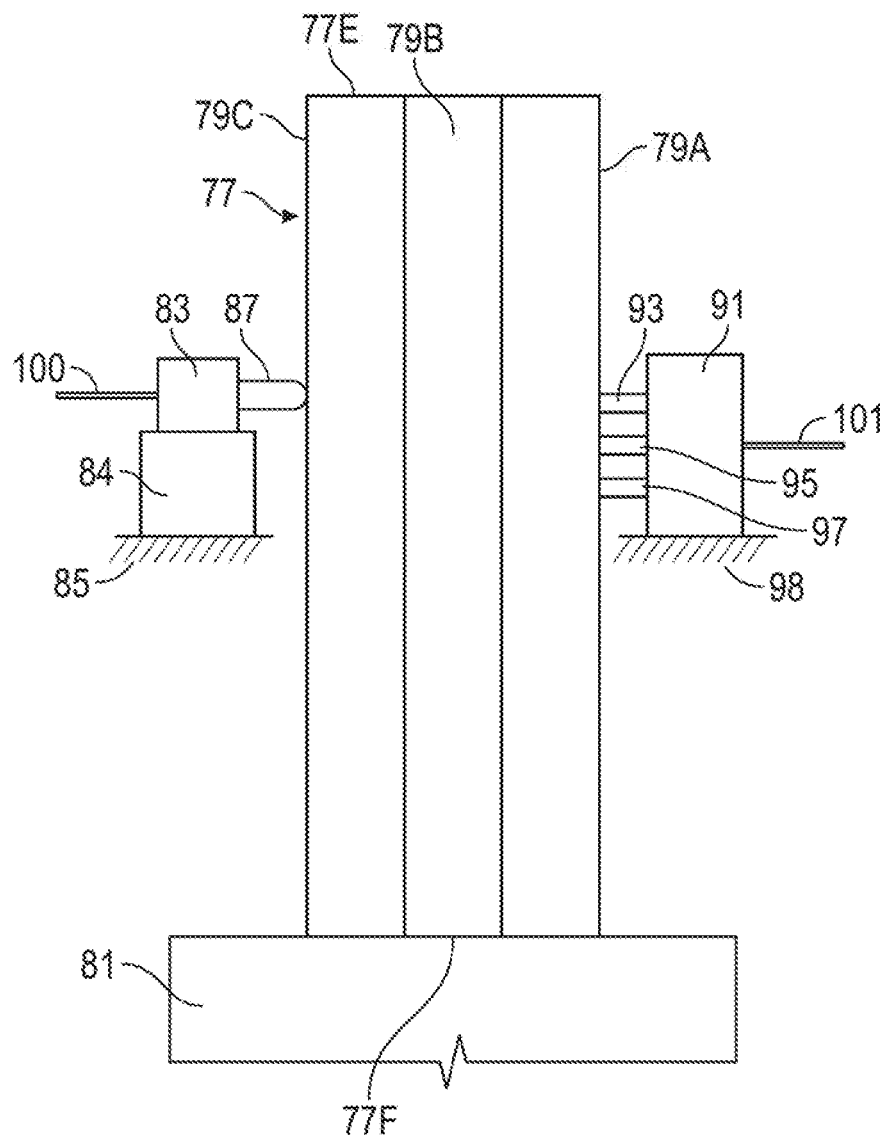
FIG. 5 is a schematic diagram of the apparatus, system, and method of the present invention used to measure the large load applied to the load carrying member.

FIG. 5 is a schematic diagram of one embodiment of the overall setup of the measuring system of the present invention. In FIG. 5 a side view is presented of a load-carrying member 77 with the measuring devices positioned for taking the various measurements necessary to calculate the heavy load to be measured. Load-carrying member 77 sits on a firm base 81 that is capable of supporting the load or dead weight to be measured, as well as the load-carrying member. Linear displacement probe 83 sits on the separate support 84, which is fixed on base 85. Sensor 87 of probe 83 is positioned to sense and measure changes in the dimension of load-carrying member 77. Control and data transfer line 100 connects to the data acquisition and computer analysis system as depicted in FIG. 2.

Referring back to FIG. 5, housing 91 holds weakly spring-loaded transducers: a) ultrasonic transducer 93, which generates a vertically polarized ultrasonic shear wave; b) ultrasonic transducer 95, which generates a horizontally polarized ultrasonic shear wave; and c) ultrasonic transducer 97, which generates a longitudinal ultrasonic wave. Housing 91 is held fixed on a separate base 98. Control and data communication line 101 connects into the data acquisition-processing and computer analysis system depicted in FIG. 2. A detailed description of an actual set up using an embodiment of the present invention is presented in detail below.

Referring to the load-carrying member 77 depicted in FIGS. 4 and 5 the length of load-carrying member 77 is nearly three times its cross-sectional diameter. The sensors and transducers are positioned in the middle section of load-carrying member 77. This configuration takes advantage of Saint-Venant's principle, which allows one to assume stress distribution may be assumed independent and thus uniform of the mode of load application except in the immediate vicinity of the load application points. Thus by placing displacement sensor 87 and transducers 93, 95 and 97 in the middle of load-carrying member 77, in this case within a 70 mm center section of load-carrying member 77, the assumption can be made that the stress is virtually uniform when a load is applied. The stress points being the top and bottom of load-carrying member 77 are the top 77E and the bottom 77F, respectively. Top 77E and bottom 77F being the points where the effect of the load impacts load-carrying member 77.

Referring back to FIG. 2, load-carrying member 51 sits on a firm base 54 that can support applied load 53 that is applied to load-carrying member 51. As discussed in more detail elsewhere herein, the invention has a significant application for weighing very large or enormous loads. Loads that can equal or surpass 300 to 500 tons. It is noted that with a larger cross-sectional area and a high yield strength of the load carrying member 51, load capacity can exceed 1000 tons or more. Thus, the applied load 53 being weighed can vary from 40 foot cargo shipping containers that can carry up to 26 metric tons, to large vehicles, ships, etc.

Referring to FIG. 2 as noted elsewhere herein one of the requirements of the invention is that the readings be taken under isothermal conditions with respect to readings taken for the change in linear displacement of the load-carrying member 51 from a zero load state to a fully loaded state. The dimension of the load-carrying member under an applied load can change as the ambient temperature drifts with time. A number of options are available to assure such isothermal conditions. One way is to keep the ambient temperature around load carrying member 51 constant while the measurements are taken in both the zero load and fully loaded state. If this option is chosen it is desirable to minimize the temperature drift to less than a few tens of one mC°, as 1 C° variation induces 275 nm dimensional changes on the load-carrying member made pf 7075 Aluminum alloy.

Another alternative is to provide an identical load free member 52, identified as the zero reference load member, substantially identical to the load carrying member with its own linear displacement probe 63. Zero reference member 52 is within the proximity of the load-carrying member 51 and thus is subject to the same ambient temperature changes as the load-carrying member 51. Both probes 61 and 63 are positioned to detect changes in dimensions of the respective load-carrying member and zero reference member to which they are adjacent. Data transfer communication line 61A connects probe 61 to digital readout meter 65 and data transfer communication line 63A connects probe 63 to digital read out meter 65. Digital readout 65 is set in subtraction mode to thereby remove any dimensional changes caused by a temperature change in load carrying member 51 and only transfer the actual dimensional changes to load carrying member 51 caused by the applied load. In turn this information is transmitted via line 65A to Computer 75 to be used in the subject calculations.

An example of an appropriate digital read out meter with the appropriate subtraction mode is model DR600 made by Solartron, Inc. It also has the capability of displaying the output of the individual probes in real time. However, any similarly capable device could be used.

Various types of linear displacement probes 61 and 63 can be used. Among them are: 1) a non-contact type of laser interferometric system, or 2) a linear optical encoder displacement probe, which is a contact type of system. Obviously, other types of probes or systems which can accomplish the same results can be used. Additionally, the dimensional changes, they can also be measured by adopting a laser interferometric technique. Examples of potential interferometers are a Fabry-Perot Interferometer (FPI) or Michelson Interferometer.

As noted above three different types of ultrasonic waves are generated by an array of three ultrasonic transducers. As depicted in FIG. 2 transducer 55 generates a vertically polarized ultrasonic shear wave, transducer 57 generates a horizontally polarized ultrasonic shear wave, and transducer 59 generates a longitudinal ultrasonic wave. The ultrasonic waves generated by each of the transducers propagates through load carrying member 51 where they travel through load carrying member 51 and are reflected at the opposite surface at side 51L and travel back to their respective ultrasonic transducer. Switch box 67 is used to control the operation of each transducer and causes each transducer to generate in turn an ultrasonic pulse or wave. Switch box 67 then transfers the data from each operation of each transducer to Pulser-Receiver 69. In turn Pulser-Receiver 69 amplifies each signal it receives from switch box 67 and transfers it to oscilloscope 71 which measures the round trip time of each signal with an accuracy of a few parts in 100,000 and transfers this information via communication bus 73 to computer 75.

In the embodiment of the system depicted in FIG. 2 a 200 MHz bandwidth Panametrics Pulser-Receiver with 5 ns rise time is used to feed excitation pulses to three transducers via switch box and in turn receive the return signals and amplify and transmit the return signals to oscilloscope 71. Oscilloscope 71 in the embodiment depicted can be a 500 MHz Tektronix digital oscilloscope. Communication line 73 in the embodiment depicted is a GPIB bus of National Instruments, Inc. However, any similar devices can be used that have the same or similar capabilities of those identified herein.

The types of transducers that can be used include i) contact-type piezoelectric longitudinal and shear transducers, ii) non-contact type electro-magnetic acoustic transducers (EMATS), and iii) high-intensity laser irradiation and detection methods. In the embodiment depicted in FIG. 2 above are broad band piezoelectric transducers with 5 MHz central frequency made by Panametrics, Inc. However, any ultrasonic transducers that have the same or similar capabilities can be used to achieve the necessary results. Regarding the ultrasonic transducers a number of possibilities exist. AS noted a single non-contact EMAT (electromagnetic acoustic transducer) with single magnet and a pancake coil, which generates all three types of ultrasonic waves and detects all three types. This EMAT, combined with electro-magnetic acoustic resonance (EMAR) technique, looks very promising to detect small changes of wave speeds of three types of ultrasonic waves in a slightly anisotropic solids caused by application of uniaxial stress. This method can apply to substantially anisotropic solids, such as a (001) oriented silicon single crystal for detection of stress-induced small changes of wave speeds. Another possibility is a contact type piezoelectric transducer (PZT) which generates and detects both longitudinal and shear waves in anisotropic materials, such as a (001) oriented silicon single crystal by using single or two or three PZT elements inside single PZT unit. This type of transducer can be purchased from a commercial vendor by a special order. This will substantially simplifies the measurements but less ideal than con-contact EMAT method. If a single transducer with combination of longitudinal and shear waves is not available, one can rely on separate one longitudinal and the other shear transducer to achieve similar results. Also, three piezoelectric transducers, one longitudinal and two shear transducers can be used as described elsewhere herein.

Figure 6:
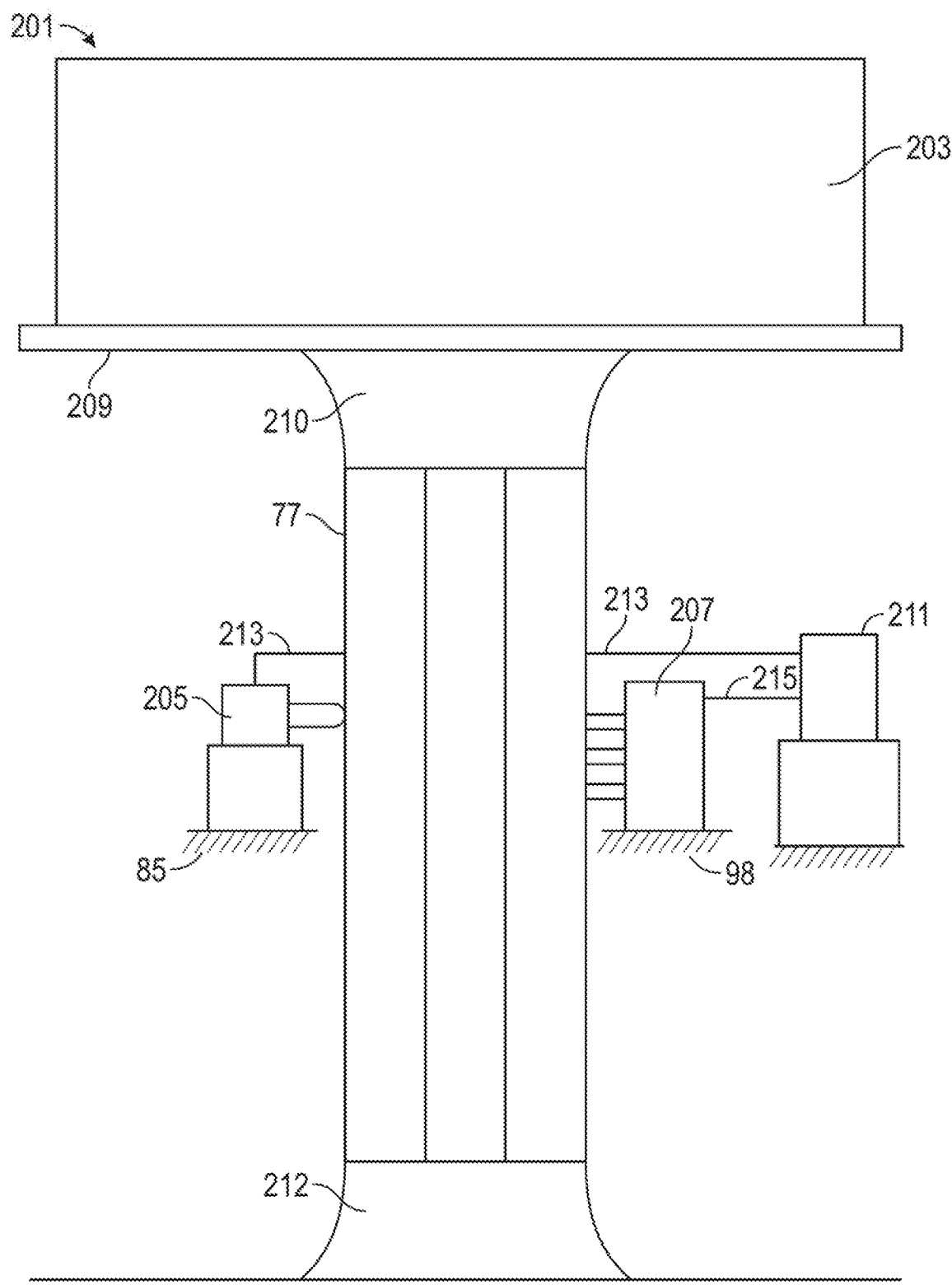
FIG. 6 is a schematic diagram of one potential use of an embodiment of the present invention.

FIG. 6 is a schematic diagram, not to scale, of an embodiment of a set up the APLGMS measuring system of the present invention for weighing of large and heavy objects in a commercial setting 201. Specifically, it depicts a standard 40 foot cargo container 203 being weighed by a system, apparatus and method configured according to the present invention. Linear displacement probe set up 205 and the three ultrasonic transducers 207 are positioned adjacent to load-carrying member 77 to carry out the necessary measurements need to make the calculations of weight of container 203, which is positioned on to weighing platform 209. The rest of the APLGMS measuring system is represented by block 211. Block 211 contains all of the other parts of that system depicted in FIG. 2. Block 211 connects to linear displacement probe set up 205 by data transfer and communication line 213 and transducer array 207 connects to block 211 by data transfer and communication line 215.

Figure 7:
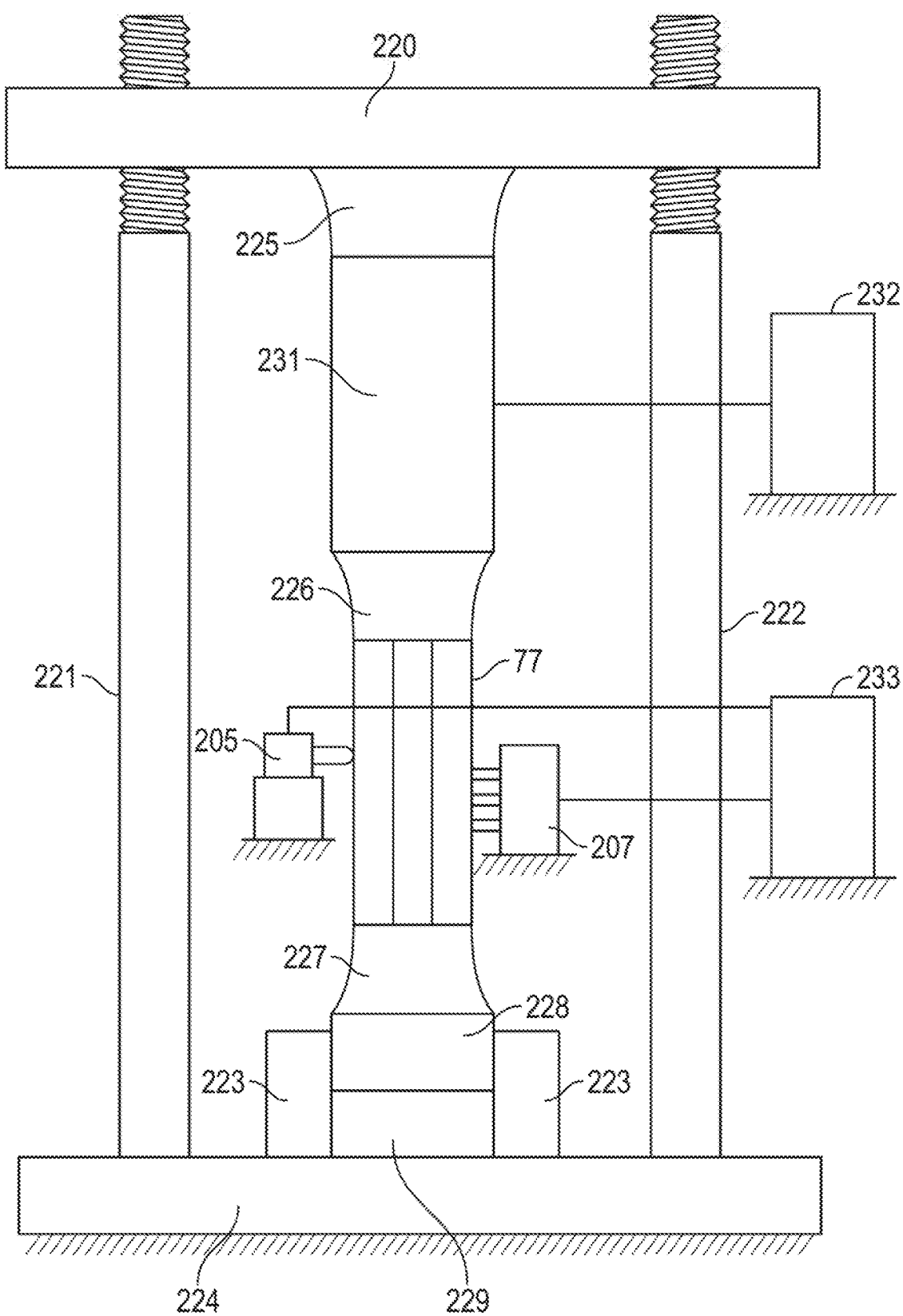
FIG. 7 is a schematic diagram that shows a calibration method of the conventional load cells having an electrical output for an applied load by the APLG subjected to the same load.

System 201 could be located at a port facility, a rail yard or truck depot. Typically these cargo containers are moved around by large cranes. Cargo containers such as container 203 can typically carry a load of up to 26 metric tons. As noted FIG. 6 is merely a schematic diagram of how the APLGMS measuring system of the present invention might be used in a commercial setting it does not the additional structure normally part of such systems such as stabilizers, superstructure to hold the system, cranes to move the object to be weighed, etc. which are well known in the art. Additionally, as noted the system can be used to weigh much heavier objects or loads, such as up to 1000 tons or more. As will be discussed below with respect to FIG. 7, the invented APLG (Absolute Precision Load Gauge) is a precise absolute load gauge, and therefore it can be used to calibrate numerous load cells and gauges, the output of which are not in units of force or mass but are in electrical units. These electrical load cells or gauges are currently in wide use. Calibration can be done in material-testing places, where large-capacity tensile or compressive machines exceeding a few hundred or a thousand tons are equipped. Calibration need not to be done in places which stock extra-large dead weights, because calibration against extra-heavy dead weight is difficult and expensive FIG. 7 is a schematic diagram that shows one of the most useful and effective applications of the APLG for calibration of the numerous load cells, which are currently in wide use and have electrical outputs for load measurement. Top horizontal plate 220, two vertical columns 221 and 222, bottom plate 224, cylindrical piston housing 223, piston 228, and hydraulic fluid 229 make up a tension-compression machine. The top plate is engaged by the screws with two vertical columns (hidden in the diagram) and it can move up or down by motorized screw motion. The piston 228 near the bottom can move up or down by adjusting the hydraulic fluid pressures, which are provided by the external pumping station (see 160 in FIG. 9). The block 77 is the load carrying member (LCM) mentioned in FIG. 5 and the block 231 is a conventional load cell, which outputs the applied load in electrical units and is currently in wide use. The block 231 represents a load carrying member (LCM) together with the load sensors, which are usually an array of thin-film strain gages that are tightly bound on the surface of the LCM. Blocks 232 and 233 are the associated measurement assemblies, which are respectively connected to the electrical load cell 231 and the load carrying member (LCM) 77 of the APLG system. Blocks 205 and 207 are respectively linear encoder displacement probe and transducer array, which are as shown in FIG. 6. The electrical load cell 231 and the LCM are loaded through the load adaptors 225, 226 and 227. They can be loaded either in tensile or in compressive mode by moving the top plate up and down, respectively. The compressive load is applied by moving the piston upward and in this case the top plate is fixed in space. This compressive load was applied to the LCM when the inventor tested the validity of the APLG at the Test Bay of Cornell University. This calibration method mentioned here can be widely applied to calibrate the electrical load cells and can save the expensive calibration costs because they do not need to take their electrical load cells to the National Institute of Standards and Technology (NIST) and institutes of having extra-large dead weights. All they need is a large capacity tension or compression machine of capacity 1000 tons or more and a well setup APLG system for load calibration and measurement.

Overview of APLG System

The present invention uses a system of equations an algorithm to calculate the applied load directly in force units of newtons or mass units of kilograms. The algorithm, the Absolute Precision Load Gauge Algorithm (APLGA) is used to calculate the applied load based on readings of the speed of the three different ultrasonic waves through the load-carrying member and the cross-sectional dimensions of the load-carrying member in the zero load state and under the full weight of the applied load to be measured as discussed elsewhere herein.

Figure 8A:
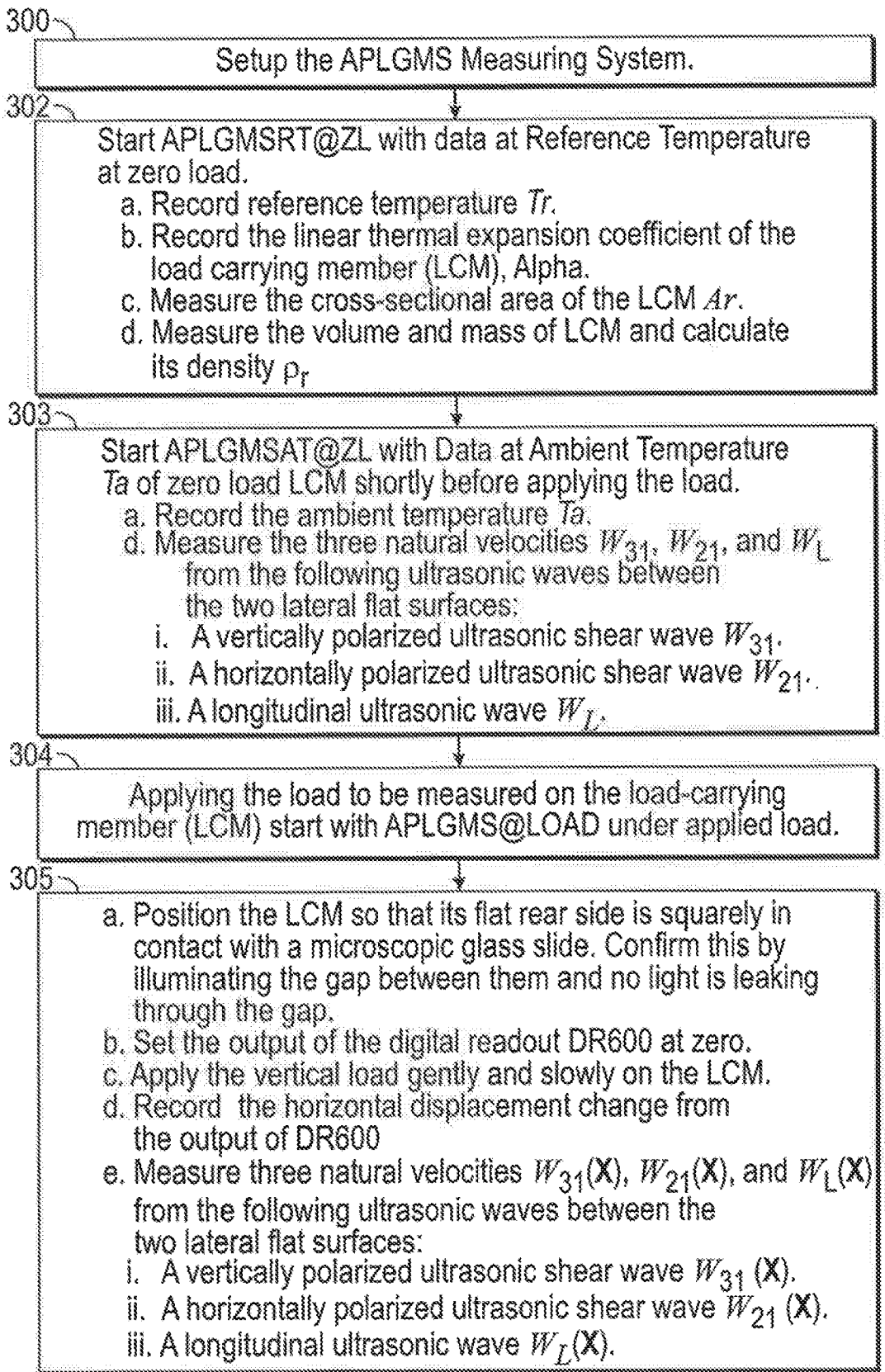
FIG. 8A is part of a flow chart of the steps of one embodiment of the process or method of the present invention.

FIGS. 8A and 8B provide a flow chart of an overview and summary of the major steps of one embodiment of the APLGA. Reference to FIGS. 8A and 8B and their recapitulation below can be used as a guide during a review of the theoretical and experimental verification sections below.

Setup the APLGMS Measuring System 300 FIG. 8A:
1. Start APLGMSRT@ZL with data at Reference Temperature $T_r$ kept constant and a zero load on the load-carrying member (LCM) 302.
   a. Record zero reference temperature $T_r$
   b. Record the linear thermal expansion coefficient of LCM, Alpha
   c. Measure the cross-sectional area of the LCM $A_r$.
   d. Measure the volume and mass of LCM and calculate its density $\rho_r$
2. Start APLGMSAT@ZL with Data at Ambient Temperature $T_a$ of zero load LCM shortly before applying the load 303.
   a. Record the ambient temperature $T_a$.
   d. Measure the roundtrip travel time from the following ultrasonic waves between the two lateral flat surfaces:
      i. A vertically polarized ultrasonic shear wave $W_{31}$.
      ii. A horizontally polarized ultrasonic shear wave $W_{21}$.
      iii. A longitudinal ultrasonic wave $W_L$.
3. Applying the load to be measured on the load-carrying member (LCM).
   Start with APLGMS@LOAD under applied load 304, with the following steps 305:
   a. Position the LCM so that its flat rear side is squarely in contact with a Microscope glass slide. Confirm this by illuminating the gap between them and no light is leaking through the gap.
   b. Set the output of the digital readout DR600 at zero.
   c. Apply the vertical load gently and slowly on the LCM.
   d. Record the horizontal displacement change from the output of DR600
   e. Measure the roundtrip travel time from the following ultrasonic waves between the two lateral flat surfaces:
      i. A vertically polarized ultrasonic shear wave $W_{31}(X)$.
      ii. A horizontally polarized ultrasonic shear wave $W_{21}(X)$.
      iii. A longitudinal ultrasonic wave $W_L(X)$.
5. Start APLGMS-CalcLoad by recalling MATLAB Program CAlbFree LoadCell 306.
   a. Calculate the cross-sectional area $A_a$ of LCM by $A_a=A_r[1+2\text{Alpha}\times(T_a-T_r)]$.
   b. Calculate the lateral acoustic path length La1 of LCM by $L_{a1}=L_r[1+\text{Alpha}(T_a-T_r)]$
   c. Calculate the density $\rho_a$ by $\rho_a=\beta_r[1+3\text{Alpha}(T_a-T_r)]^{-1}$.
   d. Calculate SOECS $C_{11}^S=\rho_a W_L^2$, $C_{44}^S=\rho_a(W_{21}^2+W_{31}^2)/2$. For a nearly isotropic solid at zero load. $C_{12}^S=(C_{11}^S-C_{44}^S)$.
   e. From the inverse of $[C_{ij}^T]$ matrix, find $S_{ij}^T$. Find $E(a)=1/S_{11}^T$, and Poisson's ratio $=-S_{12}^T/S_{11}^T$, where $E(a)$ is Young's modulus at zero load.
   f. Calculate thermal parameters $Z_0$, $Z_1$, $Z_2$ and $Z_3$ (see Eqs. 11a and 11.b) from the knowledge of $S_{11}^T$, $S_{12}^T$, $\Delta$ and temperature derivatives of $S_{11}^T$ and $S_{12}^T$, found in the literature.
   g. Calculate the quantities $E_a$, $E_b$, $E_c$, $E_d$, $E_e$, and $E_f$ (see Eqs. 13b-13g below).
   h. Calculate the quantities g and h (see Eq. 16 below).
   i. Calculate the thermodynamic stress $\tau_{33}$ from the equation $(gE_d+hE_e+2gE_f)\tau_{33}^2+(S_{12}^T-gE_a-hE_b-2gE_c)\tau_{33}-(\lambda_1^2-1)/2=0$
   j. Calculate $C_{111}^T$, $C_{112}^T$, and $C_{123}^T$ (see Eq. 14 below).
   k. Calculate $S_{111}^T$ (see Eq. 17 below).
   m. Calculate the vertical principal stretch $\lambda_3$ and Cauchy stress $\sigma_{33}$. (see Eq. 18 below).
   n. Finally calculate applied load P (see Eq. 18 below).

In the finite deformation theory the thermodynamic stress $T_{33}$ is calculated using the complex formulae and measured data. (Note mathematical numeration and quantities, variables or symbols used in equations mathematical derivations etc. are identified in the glossary of terms set out at paragraph [0081] below) Dimensional changes are measured in the isothermal condition. The applied Cauchy stress $\sigma_{33}$ is obtained from $\tau_{33}$ and fractional dimensional changes in lateral and vertical directions. Wave propagation is an adiabatic process that yields adiabatic second order elastic constants. Third order elastic constants obtained from the wave speed data and the dimensional change are mixed elastic constants. These adiabatic and mixed elastic constants are converted into isothermal values using the thermodynamics of finite deformation of elastic solids developed by the inventor. Then the isothermal second order elastic compliance constant $S_{33}^T$ and the isothermal third order elastic compliance constant $S_{333}^T$ are calculated. Finally applied load P is expressed in elegant simple form as $P=A_a\tau_{33}[1+S_{33}^T\tau_{33}+(\frac{1}{2})(S_{333}^T-S_{33}^{T^2})\tau_{33}^2+\ldots]$, where $A_a$ is the initial cross-sectional area of the specimen at zero load. For an isotropic specimen at zero load, $S_{33}^T=S_{11}^T$, and $S_{333}^T=S_{111}^T$ According to the linear elasticity theory in the uniaxial homogeneous loading, say in the vertical direction 3, on an initially isotropic specimen at zero load, strain $\varepsilon_{33}$ is linearly related to the Cauchy stress $\sigma_{33}$ by the Hooke's law $\alpha_{33}=E\varepsilon_{33}$ where $E=1/S_{11}$ is the Young's modulus of a load-carrying specimen and can be easily and accurately obtained by measuring the longitudinal and shear wavespeeds, which also yield the Poisson's ratio $v=S_{12}/S_{11}$.

Measuring the strain $\varepsilon_{33}$ accurately in the loading direction is much more difficult than the horizontal strain $\varepsilon_{11}$ or $\varepsilon_{22}$, which can be easily and accurately measured by measuring the dimensional change of the specimen in the horizontal direction. Here, $S_{11}$ and $S_{33}$ are the elastic compliance constants referred to horizontal and vertical direction, respectively. Then vertical strain $\varepsilon_{33}$ equal to $-\varepsilon_{11}/v$ when multiplied by E, yields the Cauchy stress $\sigma_{33}$. $\sigma_{33}$ multiplied by the cross-sectional area of the specimen in situ finally yields the applied load. However, a slight complication arises in this method. The Young's modulus and Poisson's ratio obtained from the longitudinal and shear wavespeeds are adiabatic constants, while the dimensional changes are measured in the isothermal condition. The adiabatic Young's modulus and Poisson's ratio can be easily converted into isothermal values by using the thermodynamics of elastic solids.

The isothermal Young's modulus and isothermal Poisson's ratio should be used to calculate the applied load. The applied load using the linear elasticity theory is fairly accurate within a few percent error but may not be accurate enough in most cases that require a higher accuracy. To improve the accuracy of the load measurement, the finite deformation theory of elastic solids is adopted to derive the formulas for the applied load. In finite deformation theory, the internal or mechanical energy contains not only harmonic potential but also anharmonic terms that contribute to the nonlinear elastic behavior of the material.

Among other things the APLGA is used to derive equations for calculation of P the load to be measured. As will be shown in detail below various forms for calculating the value of P are formulated. The following six variations are derived in the sections covering the detailed derivation of the APLGA algorithm:

a. $P = A_a \lambda_1^2 \sigma_{33}$
b. $P = A_a \lambda_3 \tau_{33}$
C. $P = A_a (1+2\eta_{33})^{1/2} \tau_{33}$
d. $P = A_a \tau_{33} (1+\eta_{33}-\eta_{32}^2/2+\ldots)$
e. $P = A_a \tau_{33} [1+S_{33}^T \tau_{33}+(S_{333}^T-S_{33}^{T^2})\tau_{33}^2/2]+\ldots$
f. $P = A_a \tau_{33} [1+E(a)^{-1}\tau_{33}+(S_{333}^T-E(a)^{-2})\tau_{33}^2/2]+\ldots$ (For an initially isotropic solid, $S_{11}=S_{33}$ and $S_{111}=S_{333}$)

While theory and derived algorithms and the equations listed above may seem complex and convoluted in one embodiment of the invention it can be reduced to merely solving the following equation:

$$P = A_a \lambda_3 \tau_{33}$$

where P is the weight of the object or applied load, $A_a$ the cross sectional area of the load-carrying member at zero load, and $\tau_{33}$ is the thermodynamic stress on the load-carrying member when the load to be measured is applied on it. $\tau_{33}$ as shown in detail below is calculated using the APLGA algorithm. Use of equation $P=A_a \tau_{33}$ results in an error of less than 1% as will be shown below.

For example as will be discussed in more detail below in the fifth equation listed above $P = A_a \tau_{33}[1+S_{33}^T \tau_{33}+(S_{333}^T-S_{33}^{T^2})\tau_{33}^2/2]+\ldots$ the second term $S_{33}^T \tau_{33}$ in the above equation contributes 0.3% or less to the APLG load P and the third term $(S_{333}^T-S_{33}^{T^2})\tau_{33}^2/2$ provides a negligible contribution of less than 0.002% to the APLG load P and may be discarded with a desired accuracy 0.01% for the APLG load. This means that APLG load is largely determined by the first term $A_a\tau_{33}$ alone with less than 1% error. Thus $P \cong A_a\tau_{33}$. However, all of the terms of the fifth equation should be used for precise calculation of the applied load.

Experimental Verification

Figure 9:
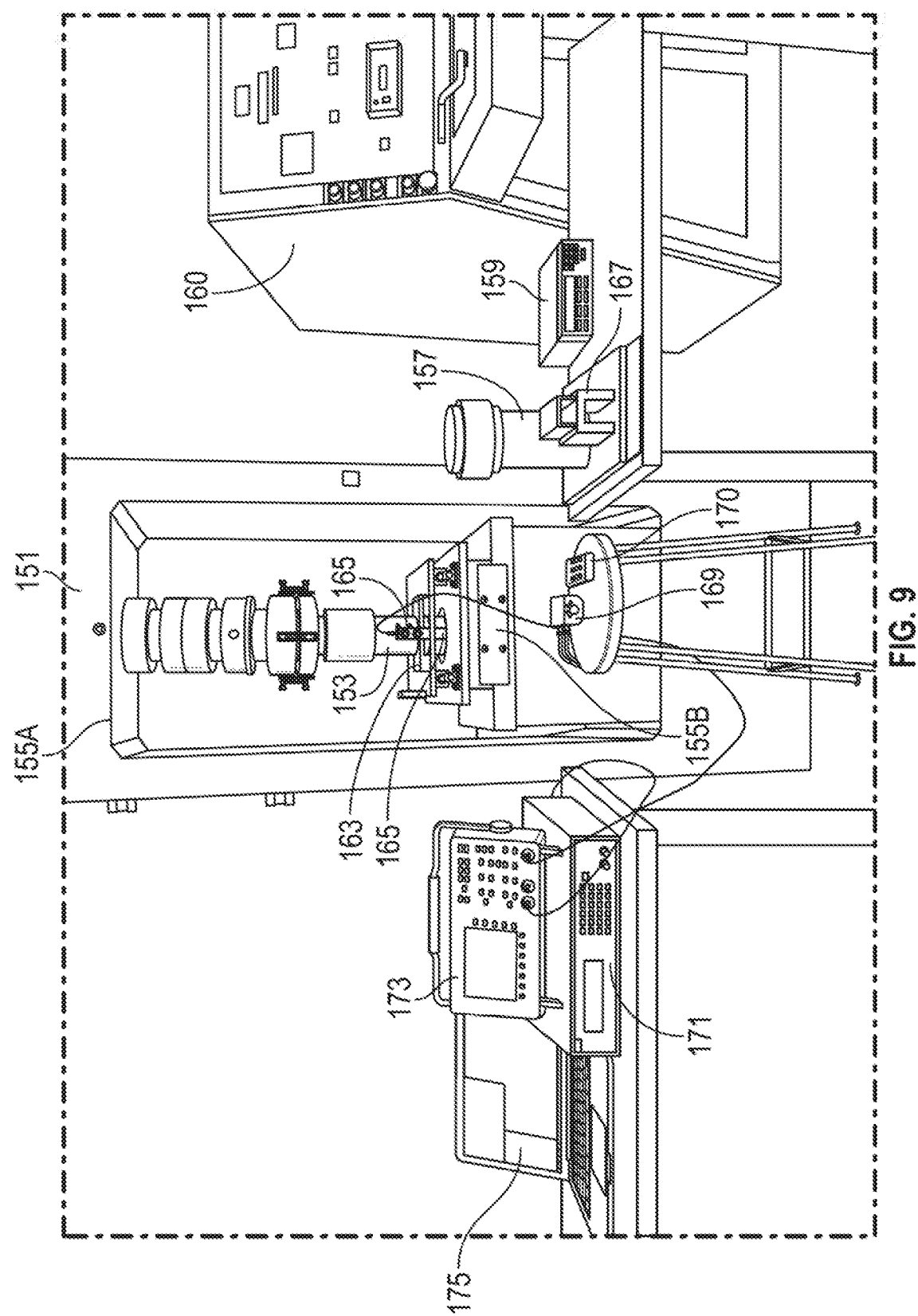
FIG. 9 is a view of the experimental setup used by the inventor to validate his theory and verify that the Absolute Precision Load-Gauge algorithm can calculate the load or mass.

FIG. 9 is a view of the experimental setup of the inventor used to validate his theory and the Absolute Precision Load-Gauge Algorithm the inventor developed. FIG. 2 previously introduced, is the schematic diagram of the experimental setup, which is also an exemplary example of one way to set the measuring system for use in practicing the invention.

Referring back to FIG. 9, which depicts a compression machine 151, capable of exerting 300 imperial tons of pressure. Load-carrying member 153 is positioned between the piston 1556 and upper adaptor of compression machine 151. A zero reference member 157 is adjacent to the compression machine 151. Digital read-out meter 159 is adjacent to zero reference member 157. Transducers 161, 163, and 165 (see FIG. 10 for detail) are positioned adjacent to and in front of load carrying member 153. Linear displacement probe 167 is adjacent to zero reference member 157 and positioned to take readings of changes in the lateral dimensions of zero reference member 157. Switch box 169 connects to 200 MHz Pulser Receiver 171, which in turn, connects to 500 MHz digital oscilloscope 173. All of these connect to computer 175.

Figure 10:
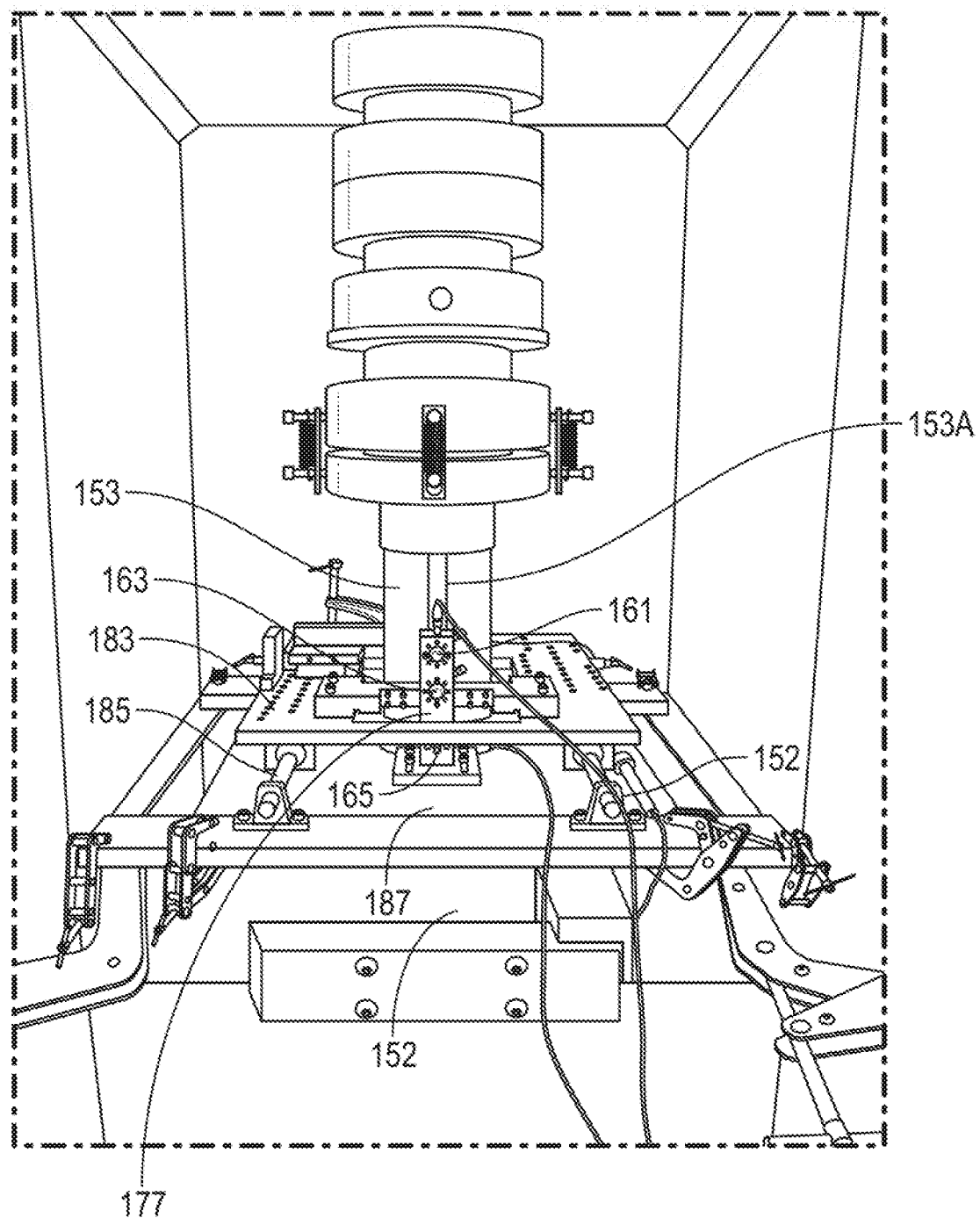
FIG. 10 provides a front close up view of the load carrying member, where the transducers are positioned in the experimental setup depicted in FIG. 9.

FIG. 10 provides a front view of the transducer holding jig 177 that holds and positions transducers 161, 163, and 165 to take the necessary readings.

Figure 11:
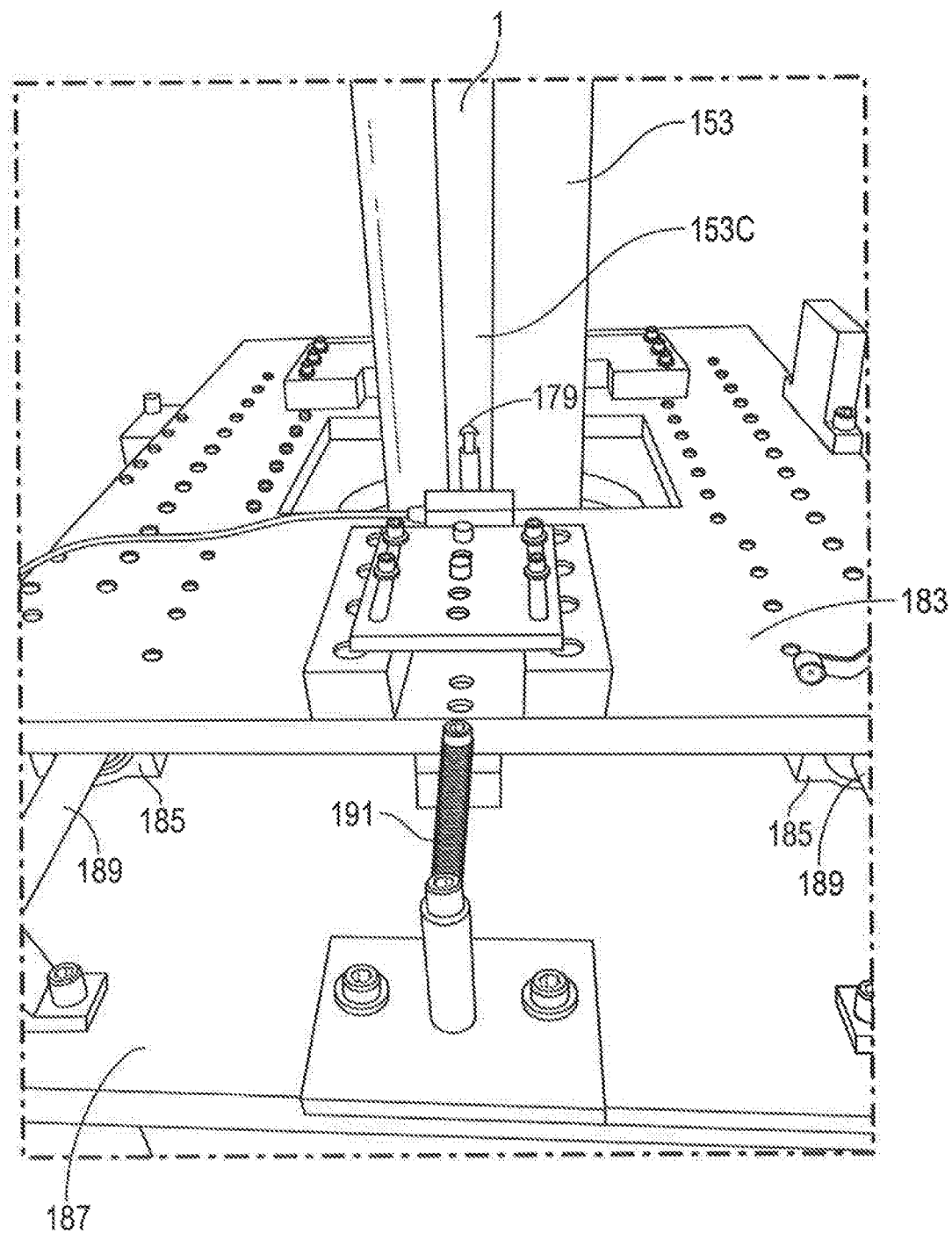
FIG. 11 is a close up view of the rear of the experimental setup of FIG. 10 depicting the linear displacement probe used for displacement readings.

Referring to FIG. 11, a rear view of load-carrying member 153 with linear displacement probe 179 positioned to take readings of the lateral dimensions of load-carrying member 153.

Referring back to FIG. 9 the applied load P is exerted on the load-carrying member 153 by a 300 imperial tons capacity compression machine 151. As noted above in the embodiment of the invention depicted load-carrying member 153 is made of a cylindrical block of high-strength 7075 aluminum alloy with 122.61 mm cross-sectional diameter and about 360 mm height. The 7075 aluminum alloy has yield stress of over 420 MPa and the load-carrying member can be loaded to 480 metric tons without inducing plastic deformation. The 360 mm high circumferential side wall is shaped with four 19 mm wide flat faces, each 90 degrees apart.

Referring to FIG. 10 the three ultrasonic transducers SV 161, SH 163 and L 165 are in contact with the mid-section of the front flat face 153A of the load-carrying member 153. The ultrasonic transducers are the products of Panametrics, Inc., which are a broad band transducer with 5 MHz central frequency. As can be seen in front of the load-carrying member 153 in FIG. 10, the transducers are held in place by jig 177 fixed on the lower aluminum plate 187. Load-carrying member is placed in the middle of the top surface of the compressor piston 152 and stands through the central holes of upper 183 and lower 187 aluminum plates.

Shown in FIG. 11 is a digital displacement probe 179 in contact with the flat surface 153C of the rear side of the load-carrying member 153 with a small internal spring force. Probe 179 is mounted on the upper aluminum plate 183, which slides with little friction with four linear ball bushings along two circular shafts 185 mounted on the lower aluminum plate 187, which is separated from the load-carrying member 153 and sits fixed on the flat side bars attached on both sides of the inner column walls of the compressor. One mm thick flat microscopic glass slide placed on the front flat surface of the upper aluminum plate is in contact with the front flat surface of the load-carrying member with a small force exerted by a tension spring 191 on the rear side of the load-carrying member, as shown on the bottom of FIG. 11. Saint-Venant's principal implies that the 360 mm long cylinder length, which is nearly three times the cross-sectional diameter, ensures virtually uniform stress on the midsection of about 70 mm height, where the three ultrasonic transducers and displacement probe are located.

The linear encoder digital displacement probe 179 is a product of Solartron, Inc., model LE/25/S with a displacement resolution of 50 nm. The dimension of the load-carrying member under an applied load changes as the ambient temperature drifts with time. To compensate for the dimensional variations due to the temperature drift, a second probe 167 (see FIG. 9) identical to probe 179 is placed in contact with a zero load sample, which has nearly identical cross-length and is made of the same material with the load-carrying member under the applied load. Probe 167 is placed next to a digital readout meter 159, model DR600 of Solartron, Inc. They are shown on the left side of the right table in FIG. 9. The outputs of both probes are fed into meter 159 in subtraction mode to nearly compensate for the dimensional changes due to temperature drifts. Without the second probe employed, it is desirable to minimize the temperature drift less than a few tens of one mC°, as 1 C° variation induces 275 nm dimensional change on the load-carrying member. Meter 159 is also capable of displaying the output of individual probes 179 or 167.

A 200 MHz bandwidth Panametrics Pulser-Receiver 171 with 5 ns rise time is used to feed excitation pulses to three transducers via a switch box 169. The sound waves launched from transducers 161, 163 and 165 travel across load-carrying member 153, reflect back on the opposite flat face 153C and return to the transducers. They are amplified by the Pulser-Receiver and displayed on the 500 MHz Tektronix digital oscilloscope 173. The round trip travel times of echoed pulses are measured on the oscilloscope with an accuracy of a few parts in 100,000. The oscilloscope signals are brought into the digital computer via 73 (see FIG. 2), the GPIB bus of National Instruments, Inc. The oscilloscope and digital computer are on the left table in FIG. 9.

Finally, the output of the digital readout of the DR600 is brought into a digital computer, which processes the four measured quantities obtained both at zero load and applied load P through MatLab software "CalbFree_LoadCell" using the formulae shown in the theoretical discussions that start at paragraph [0079]. Computer 175 running the software on the cited formulae outputs $C_{11}^T$, $C_{12}^T$, $S_{11}^T$, $S_{12}^T$, $C_{111}^T$, $C_{112}^T$, $C_{123}^T$, $S_{111}^T$, $S_{112}^T$, $\lambda_1$, $\lambda_3$, $\tau_{33}$, $\sigma_{33}$ and finally the applied load P.

As shown in TABLE I below, calculated APLG loads closely match the corresponding compressor loads with a small difference. The compressor load is only approximate, as the compressor machine did not function smoothly and its pressurizing oil medium under the piston leaked slowly during compression, and therefore it was difficult to maintain constant piston pressures. However, the close match between them provides a strong validity to the theory and experimental methods described in this article. An ultimate test lies in comparing the output of a strain-gage based load cell recently certified by the National Institute of Science and Technology (NIST) with the APLG output under the same high capacity loading machine, whether the specimen is in tension or in compression. The second term $S_{33}^T \tau_{33}$ in the parenthesis of equation P at the bottom of table 1 contributes 0.3% or less to the APLG load P. The third term $(S_{333}^T - S_{33}^{T^2})\tau_{33}^2/2$ provides a negligible contribution of less than 0.002% to the APLG load P and may be discarded with a desired accuracy 0.01% for the APLG load. This means that APLG load is largely determined by the $A_a \tau_{33}$ term alone with less than 1% error.

At zero load natural state, the acoustic path length between two opposite flat faces of the specimen is 121.18 mm and the measured density $\rho_a$, cross-sectional area $A_a$ and $S_{11}^T$ are $\rho_a = 2808.3$ kg/m$^3$  $A_a = 1.1772 \times 10^{-2}$ m$^2$  $S_{11}^T = 1.4048 \times 10^{-11}$ (Pa)$^{-1}$.

TABLE I

The values of $S_{111}^T$, $\tau_{33}$, $\sigma_{33}$, and APLG Load obtained by the CalbFree_LoadCell software program at four different compressor loads

| Compressor Load (Imperial Ton) | $S_{111}^T$ ($10^{-21}$(Pa)$^{-2}$) | $\tau_{33}$ (MPa) | $\sigma_{33}$ (MPa) | APLG Load P* (Imperial Ton) |
|---|---|---|---|---|
| ~100 | 3.2623 | 79.833 | 79.684 | 105.543 |
| ~150 | 3.2760 | 117.60 | 117.28 | 155.393 |
| ~200 | 3.2786 | 155.72 | 155.16 | 205.659 |
| ~250 | 3.3613 | 193.22 | 192.36 | 255.047 |

*P = $A_a \tau_{33} [1 + S_{11}^T \tau_{33} + (\frac{1}{2})(S_{111}^T - S_{11}^{T^2})\tau_{33}^2 + \ldots]$ Ordinary engineering polycrystalline materials exhibit a slight anisotropy, which is difficult to characterize. During the manufacturing processes they may be heat-treated and also rolled. The rolling process induces texture in the rolled material and some of the textured materials may be characterized as possessing nearly isotropic but slightly transversely isotropic symmetry about the rolled direction. One should choose a loading direction 3 that coincides with the axis of transverse isotropy of the textured specimen. The transversely isotropic material has five second order elastic (SOE) constants, which can easily be determined at zero load natural state to calculate $S_{33}^T$, $S_{12}^T$ and $S_{13}^T$. The transversely isotropic material possesses a total of 9 third order elastic (TOE) constants, which are usually measured with a significant error. A similar approach can be extended to a slightly orthotropic specimen. The details of the texture effects on the APLG load lie outside the scope of this work and will be treated elsewhere.

A more suitable specimen material may be chosen with amorphous isotropic fused quartz, because it has higher acoustoelastic constants due to its low density (2202 kg/m$^3$), less than that of 7075 aluminum alloy, and because the difference between its isothermal and adiabatic values are very small due to its low thermal expansion coefficient and may be safely ignored. Therefore, fused quartz with an approximately 100 mm cross-sectional diameter may be an ideal candidate. The drawback is that it is expensive to manufacture and fabricate such a large piece of fused quartz. Another ideal specimen candidate may be a (001) oriented single crystal of silicon with an approximately 100 mm diameter cross-sectional area. The theory can be extended without difficulty to a cubic single crystalline specimen with necessary additional measurements of the sound waves propagating in the [100] and [110] directions.

The three piezoelectric ultrasonic transducers used in this experiment are a contact type, which requires a slight lateral stress on the specimen to provide a solid coupling. This coupling pressure problem can be overcome by adopting non-contact type ultrasonic transducers, such as a dual mode EMAT (electromagnetic acoustic transducer) with a single magnet and a pancake coil. This type of EMAT is capable of measuring the sound speeds of L, SV, and SH waves with a single EMAT and may be ideally suited for construction of the APLG. Better accuracy and resolution in lateral displacement can be achieved by adopting a laser interferometric technique, a Fabry-Perot Interferometer (FPI) or Etalon could be used for this measuring technique.

Synopsis of APLG Theory

Glossary of Terms Used in Equations a: Coordinates of a specimen at zero load natural state and represents a specimen at the natural state
X: Coordinates of a specimen under an applied load and represents a specimen under load
$\rho_a$: Density of a specimen at zero load natural state
$\rho_X$: Density of a specimen under an applied load
P: Vertically applied load on a specimen in the direction 3
$\tau$: Thermodynamic stress for which $\tau_{ij}=\tau_{ij}\delta_{i3}\delta_{j3}$ (i,j=1, 2, 3)
$\sigma$: Cauchy stress for which $\sigma_{ij}=\sigma_{ij}\delta_{i3}\delta_{j3}$ (i,j=1, 2, 3)
$\eta$: Lagrange strain with $\eta_{ij}$ elements (i,j=1, 2, 3)
$L_{a1}$: Specimen length at zero load in the horizontal direction 1 along the acoustic path
$\Delta L_{a1}$: Specimen length change under an applied load in the direction 1
$\lambda_1$: Principal stretch of a specimen in the horizontal direction 1 under an applied load P
$\lambda_1=(L_{a1}+\Delta L_{a1})/L_{a1}$
$\lambda_3$: Principal stretch of a specimen in the vertical direction 3 under an applied load P.
$W_L$, $W_{21}$, and $W_{31}$: Natural wave velocities of longitudinal, horizontally polarized shear, and vertically polarized shear waves, all propagating in the horizontal direction 1 at zero load state
$W_L(X)$, $W_{21}(X)$, and $W_{31}(X)$: Natural wave velocities of longitudinal, horizontally polarized shear, and vertically polarized shear waves, all propagating in the horizontal direction 1 under an applied load P. Natural wave velocity is defined by the initial acoustic path length $L_{a1}$ divided by the travel time of the sound wave under an applied load.
$C_{\alpha\beta}^S$: Adiabatic second order elastic stiffness constants (SOESC) at zero load state, where $\alpha$, $\beta=1, 2, \ldots 6$ are the Voigt's indices
$C_{\alpha\beta}^T$: Isothermal second order elastic stiffness constants (SOESC) at zero load state
$S_{\alpha\beta}^T$: Isothermal second order elastic compliance constants (SOECC) at zero load state. Its matrix $[S_{\alpha\beta}^T]$ is an inverse of $[C_{\alpha\beta}^T]$ matrix.
$C_{\alpha\beta\gamma}^T$: Isothermal third order elastic stiffness constants (TOESC) at zero load state
$S_{\alpha\beta\gamma}^T$: Isothermal third order elastic compliance constants (TOECC) at zero load state.
$\alpha_\mu^\tau$: Thermal expansion coefficient at constant thermodynamic stress $\tau$ ($\mu=1, 2, \ldots 6$)
T: Absolute temperature expressed in units of ° K.
$C_\eta$: Specific heat of a specimen at constant Lagrange strain $\eta$
$C_V$: Specific heat of a specimen at constant volume
$\beta$: Volume thermal expansion coefficient at constant thermodynamic stress $\tau$
$B^T$: Isothermal bulk modulus of a specimen at zero load state. $B^T=(C_{11}^T(a)+2 C_{12}^T(a))/3$ Acronyms Used in the Synopsis SOESC: second order elastic stiffness constant
SOECC: second order elastic compliance constant
TOESC: Third order elastic stiffness constant
TOECC: Third order elastic compliance constant
LCM: Load-carrying member Calculation of an applied load P on a vertically loaded specimen, which was initially isotropic at zero load state, is carried out using four physical quantities measured both at the initial state of zero load and under subsequent applied load. They are the travel times of horizontally propagating longitudinal (L), vertically polarized shear (SV), horizontally polarized (SH) shear waves, and the specimen dimension along the acoustic path in the horizontal direction. Prior to these four measurements, the specimen density $\rho_a$ is separately determined from the precisely measured specimen volume and mass at zero load condition.

Detailed Derivation and Explanation of the Theory

Consider a load-carrying specimen that is loaded in the vertical direction 3. The Cauchy stress $\sigma_{ij}$ (i,j=1, 2, 3) applied in the vertical direction is specified by $\sigma_{ij}=\sigma_{33}\delta_{i3}\delta_{j3}$ and likewise the thermodynamic stress $\tau_{ij}=\tau_{33}\delta_{i3}\delta_{j3}$. The coordinates of a particle of the stressed body is said to be in the initial state and is denoted by the Cartesian coordinates X. The corresponding Cartesian coordinates under the stress-free zero load are denoted by vector a. As the stress level of the initial state X is arbitrary, it can include a stress free state a as a special case. For the sound wave propagating in the horizontal direction, say direction 1, with a wave normal n=[1,0,0], Christoffel equation is expressed as $$\begin{pmatrix} C_{11}^S(X;X)-\rho_X V^2 & 0 & 0 \\ 0 & C_{66}^S(X;X)-\rho_X V^2 & 0 \\ 0 & 0 & C_{55}^S(X;X)-\rho_X V^2 \end{pmatrix} \begin{pmatrix} u_1 \\ u_2 \\ u_3 \end{pmatrix} = 0, \quad (1)$$

where $C_{\alpha\beta}^S(X;X)$ are adiabatic thermodynamic elastic stiffness coefficients referenced to and evaluated at the initial state X, $\rho_X$ is the density of the material at the stressed initial state and V is the sound wave speed. The former X and the latter X inside the parenthesis represent an evaluation state and a zero reference state, respectively. When the reference and evaluation states are the same in the notation of the thermodynamic elastic coefficients, it is henceforth understood that the parenthesis of the thermodynamic elastic stiffness coefficients is denoted with the single argument, as in the following examples:

$C_{\alpha\beta}^{S\ or\ T}(X;X)=C_{\alpha\beta}^{S\ or\ T}(X)$, $C_{\alpha\beta\gamma}^{S\ or\ T}(X;X)=C_{\alpha\beta\gamma}^{S\ or\ T}(X)$ $C_{\alpha\beta}^{S\ or\ T}(a;a)=C_{\alpha\beta}^{S\ or\ T}(a)$, $C_{\alpha\beta\gamma}^{S\ or\ T}(a;a)=C_{\alpha\beta\gamma}^{S\ or\ T}(a)$ The same convention applies to the compliance coefficients as $S_{\alpha\beta}^{S\ or\ T}(X;X)=S_{\alpha\beta}^{S\ or\ T}(X)$, $S_{\alpha\beta\gamma}^{S\ or\ T}(X;X)=S_{\alpha\beta\gamma}^{S\ or\ T}(X)$ $S_{\alpha\beta}^{S\ or\ T}(a;a)=S_{\alpha\beta}^{S\ or\ T}(a)$, $S_{\alpha\beta\gamma}^{S\ or\ T}(a;a)=S_{\alpha\beta\gamma}^{S\ or\ T}(a)$ where the superscripts S and T in the above equations denote adiabatic and isothermal process, respectively and subscripts $\alpha$, $\beta$, $\gamma=1, 2, \ldots, 6$ are the Voigt indices.

The solution of Eq. (1) yields $$\rho_X V_L^2(X)=C_{11}^S(X) \rho_X V_{21}^2(X)=C_{66}^S(X) \beta_X V_{31}^2(X)=C_{55}^S(X), \quad (2)$$

where $V_L(X)$, $V_{21}(X)$, and $V_{31}(X)$ denote velocities of the longitudinal wave, horizontally polarized shear (SH) wave in the direction 2 and vertically polarized shear (SV) waves in the direction 3, respectively, all propagating in the direction 1 and measured at the initial state X.

The dimensional change of the load-carrying member in the [100] direction is measured in an isothermal condition, while the elastic constants obtained from the wave speed measurements are adiabatic values. Isothermal elastic coefficients $C_{\alpha\beta}{}^T$ and $S_{\mu\nu}{}^T$ can be calculated from the adiabatic values by the following conversion formulae $$c_{\alpha\beta}^T = c_{\alpha\beta}^S - T\left(\frac{\alpha_\mu^\tau \alpha_\nu^\tau C_{\mu\alpha}^T C_{\nu\beta}^T}{\rho_X C_\eta}\right) (\alpha, \beta = 1, 2, \ldots 6) \quad (3a)$$

$$S_{\mu\nu}{}^T = S_{\mu\nu}{}^S + T\alpha_\mu{}^\tau \alpha_\nu{}^\tau/(\rho_X C_\tau)(\mu,\nu=1,2,\ldots 6), \quad (3b)$$

$$[S_{\alpha\beta}{}^T] = [C_{\alpha\beta}{}^T]^{-1}, \quad (3c)$$

where $\alpha_\mu{}^\tau$ is the thermal expansion coefficient at constant thermodynamic stress $\tau$, T is the absolute temperature, $S_{\mu\nu}{}^T$ and $S_{\mu\nu}{}^S$ are respectively isothermal and adiabatic thermodynamic elastic compliance coefficients, and $C_\eta$ and $C_\tau$ are the specific heat at constant Lagrange strain $\eta_{ij}$ and at constant thermodynamic stress $\tau_{ij}$, respectively. The isothermal third order elastic constants are related to the mixed order constants $C_{\alpha\beta\gamma}{}^M \equiv (\partial C_{\alpha\beta}{}^S/\partial \eta_\gamma)_T$ by $$C_{\alpha\beta\gamma}^T = C_{\alpha\beta\gamma}^M - TC_{3\gamma}^T \frac{\partial}{\partial \tau_{33}}\left(\frac{\alpha_\mu^\tau \alpha_\nu^\tau C_{\mu\alpha}^T C_{\nu\beta}^T}{\rho_X C_\eta}\right) \quad (4a)$$

$$S_{\alpha\beta\gamma}{}^T = -S_{\alpha\nu}{}^T S_{\beta\mu}{}^T S_{\gamma\lambda}{}^T C_{\nu\mu\lambda}{}^T. \quad (4b)$$

With respect to equations 3a, 4a and 4b and elsewhere herein Einstein's convention is used namely that summation over the repeated indices is implied, unless otherwise specified.

When the direction of the applied load coincides with that of the principal strain or stress, it is convenient to introduce the principal stretches defined by $$\frac{\partial X_i}{\partial a_j} = \lambda_i \delta_{ij} \ (i \text{ fixed}). \quad (5)$$

Note that $\lambda_1 = \lambda_2$ and $\rho_X/\rho_a = 1/(\lambda_1{}^2 \lambda_3)$ apply to isotropic solids and also apply to cubic, and transversely isotropic solids when the applied loading direction coincides with one of cubic axes and the symmetry axis of transversely isotropic solids, respectively. For the case of $\sigma_{ij} = \sigma_{33}\delta_{i3}\delta_{j3}$ and $\tau_{ij} = \tau_{33}\delta_{i3}\delta_{j3}$ $$\lambda_1{}^2 = \lambda_2{}^2 = 1 + 2\eta_{11} = 1 + 2S_{13}{}^T\tau_{33} + S_{133}{}^T\tau_{33}{}^2 + \ldots \quad (6a)$$

$$\lambda_3{}^2 = 1 + 2\eta_{33} = 1 + 2S_{33}{}^T\tau_{33} + S_{333}{}^T\tau_{33}{}^2 + \ldots, \quad (6b)$$

where $\eta_{11}$ and $\eta_{33}$ are Lagrange principal strains in the directions 1 and 3, respectively. Let $L_{a1}$ and $\Delta L_{a1}$ denote the specimen length in horizontal direction 1 at the strain-free state and dimensional change in direction 1 under an applied load, respectively. $\lambda_1 = \lambda_2$ is given by $$\lambda_1 = \lambda_2 = (L_{a1} + \Delta L_{a1})/L_{a1}. \quad (6c)$$

Denoting the Young's modulus of a specimen material to be E(a) at the strain-free natural state, note that for isotropic solids at zero load $$S_{33}{}^T = S_{11}{}^T = S_{22}{}^T = 1/E(a) S_{13}{}^T = S_{12}{}^T = S_{23}{}^T \ S_{333}{}^T = S_{111}{}^T. \quad (6d)$$

Cauchy stress $\sigma_{33}$ is related to thermodynamic stress $\tau_{33}$ by Murnaghan equation as $$\sigma_{33} = \frac{\rho_X}{\rho_a} \frac{\partial X_i}{\partial a_k} \frac{\partial X_j}{\partial a_l} \tau_{kl} \delta_{k3} \delta_{l3} = \lambda_1^{-2} \lambda_3 \tau_{33}. \quad (7)$$

Now we introduce natural velocity W, which is defined by the original length $L_{a1}$ at zero load in direction 1, divided by the travel time of the sound wave at a stressed state X. For the longitudinal waves $$\rho_a W_L{}^2(X) = \lambda_3 \rho_X V_L{}^2(X) = \lambda_3 C_{11}{}^S(X) \quad (8a)$$

$$\lambda_3 C_{11}{}^T(X) = C_{11}{}^T(a) + [S_{12}{}^T(a)(2C_{11}{}^T(a) + C_{111}{}^T(a) + C_{112}{}^T(a)) + S_{11}{}^T(a)C_{112}{}^T(a)]\tau_{33} + \ldots \quad (8b)$$

Making use of Eq. 3a and $C_{11}{}^S(a; a) = \rho_a W_L{}^2(a)$, it can be seen that $$\rho_a(W_L^2(X) - W_L^2(a)) + \frac{TC_{1\mu}^T C_{1\nu}^T \alpha_\mu^\tau \alpha_\nu^\tau}{\rho_a C_V}(a) - \frac{\lambda_3 TC_{1\mu}^T C_{1\nu}^T \alpha_\mu^\tau \alpha_\nu^\tau}{\rho_X C_\eta}(X) = \quad (9a)$$

$$[S_{12}^T(a)(2C_{11}^T(a) + C_{111}^T(a) + C_{112}^T(a)) + S_{11}^T(a)C_{112}^T(a)]\tau_{33} + \ldots .$$

For shear waves, difference between isothermal and adiabatic values vanishes. Therefore, $$\rho_a(W_{21}{}^2(X) - W_{21}{}^2(a)) = [2S_1{}^T(a)\rho_a W_{21}{}^2(a) + S_{12}{}^T(a) \ C_{111}{}^T(a)/2 + (S_{11}{}^T(a) - S_{12}{}^T(a))C_{112}{}^T(a)/2 - S_{11}{}^T(a) \ C_{123}{}^T(a)/2]\tau_{33} + \ldots \quad (9b)$$

$$\rho_a(W_{31}{}^2(X) - W_{31}{}^2(a)) = [2S_{11}{}^T(a)\rho_a W_{31}{}^2(a) + (S_{11}{}^T(a) + S_{12}{}^T(a))C_{111}{}^T(a)/4 - (S_{11}{}^T(a) - S_{12}{}^T(a))C_{112}{}^T(a)/4 - S_{12}{}^T(a)C_{123}{}^T(a)/2]\tau_{33} + \ldots . \quad (9c)$$

The two terms in Eq. 9a involving the thermal expansion coefficients and specific heats can be approximated to be linearly proportional to $\tau_{33}$. We first notice that $C_\eta(X)$ is equal to $C_V(a)$ at a strain free state for isotropic and cubic solids. Its change with strain or stress is negligible within the elastic limit of solids.

$$C_\eta(X) = C_V(a) + \left(\frac{\partial C_\eta(X)}{\partial \tau_{ij}}\right)_{T;a} \tau_{ij} + \ldots \cong C_V(a) \quad (10a)$$

$$\alpha_1^\tau(X) = \alpha_2^\tau(X) = \quad (10b)$$
$$\alpha^\tau(a) + \left(\frac{\partial \alpha_1^\tau(X)}{\partial \tau_{33}}\right)_{T;a} \tau_{33} + \ldots = \alpha^\tau(a) + \left(\frac{\partial S_{12}^T(a)}{\partial T}\right)_{T;a} \tau_{33} + \ldots$$

$$\alpha_3^\tau(X) = \quad (10c)$$
$$\alpha^\tau(a) + \left(\frac{\partial \alpha_3^\tau(X)}{\partial \tau_{33}}\right)_{T;a} \tau_{33} + \ldots = \alpha^\tau(a) + \left(\frac{\partial S_{11}^T(a)}{\partial T}\right)_{T;a} \tau_{33} + \ldots$$

$$\frac{TC_{1\mu}^T C_{1\nu}^T \alpha_\mu^\tau \alpha_\nu^\tau}{\rho_a C_V}(a) = \quad (10d)$$
$$\frac{T}{\rho_a C_V(a)}[\alpha^\tau(a)(C_{11}^T(a) + C_{12}^T(a) + C_{13}^T(a))]^2 = \frac{T\beta^2 B^{T2}}{\rho_a C_V}(a) \equiv \Delta,$$

where $\beta = 3\alpha^\tau(a)$ is the volume thermal expansion coefficient and $B^T = (C_{11}{}^T(a) + 2C_{12}{}^T(a))/3$ is the isothermal bulk modulus at zero load natural state a. For simplicity of notation, hence we drop the notation (a) when the physical variables are evaluated at zero load natural state a. In Eqs. 10a-10d we use for specific heat and temperature coefficients of and $S_{11}{}^T(a)$ and $S_{12}{}^T(a)$ the values quoted in literature.

Letting $$Z_0 = 2S_{12}{}^T C_{11}{}^T + \Delta[2S_{12}{}^T C_{11}{}^T + (4/3)(S_{11}{}^T + 2S_{12}{}^T)C_{12}{}^T + 2\beta^{-1}C_{11}{}^T(\partial S_{11}{}^T/\partial T) + 2\beta^{-1}(C_{11}{}^T + C_{12}{}^T)(\partial S_{12}{}^T/\partial T)] \quad (11a)$$

$$Z_1 \equiv S_{12}{}^T(1+2\Delta/3),\ Z_2 \equiv S_{11}{}^T(1+4\Delta/3)+S_{12}{}^T(1+8\Delta/3),$$
$$Z_3 \equiv (2\Delta/3)(S_{11}{}^T+S_{12}{}^T), \qquad (11b)$$

Eqs. 9a, 9b, and 9c can be written as $$Z_1 C_{111}{}^T + Z_2 C_{112}{}^T + Z_3 C_{123}{}^T = \rho_a(W_L{}^2(X)-W_L{}^2)/\tau_{33} - Z_0 \qquad (12a)$$

$$(\tfrac{1}{2})S_{12}{}^T C_{111}{}^T + (\tfrac{1}{2})(S_{11}{}^T - S_{12}{}^T)C_{112}{}^T - (\tfrac{1}{2})S_{11}{}^T C_{123}{}^T = \rho_a(W_{21}{}^2(X)-W_{21}{}^2)/\tau_{33} - 2S_{12}{}^T\rho_a W_{21}{}^2 \qquad (12b)$$

$$(\tfrac{1}{4})(S_{11}{}^T + S_{12}{}^T)C_{111}{}^T - (\tfrac{1}{4})(S_{11}{}^T - S_{12}{}^T)C_{112}{}^T - (\tfrac{1}{2})S_{11}{}^T C_{123}{}^T = \rho_a(W_{31}{}^2(X)-W_{31}{}^2)/\tau_{33} - 2S_{11}{}^T\rho_a W_{31}{}^2. \qquad (12c)$$

$C_{111}{}^T$, $C_{112}{}^T$ and $C_{123}{}^T$ in terms of $\tau_{33}$ are expressed with the following determinants:

$$D \equiv \frac{1}{8} \begin{vmatrix} Z_1 & Z_2 & Z_3 \\ S_{12}^T & S_{11}^T - S_{12}^T & -S_{11}^T \\ S_{11}^T + S_{12}^T & -S_{11}^T + S_{12}^T & -2S_{12}^T \end{vmatrix} \qquad (13a)$$

$$E_a \equiv \frac{\rho_a}{D} \begin{vmatrix} W_L^2(X) - W_L^2 & Z_2 & Z_3 \\ W_{21}^2(X) - W_{21}^2 & (S_{11}^T - S_{12}^T)/2 & -S_{11}^T/2 \\ W_{31}^2(X) - W_{31}^2 & (S_{12}^T - S_{11}^T)/4 & -2S_{12}^T \end{vmatrix} \qquad (13b)$$

$$E_b \equiv \frac{\rho_a}{D} \begin{vmatrix} Z_1 & W_L^2(X) - W_L^2 & Z_3 \\ S_{12}^T/2 & W_{21}^2(X) - W_{21}^2 & -S_{11}^T/2 \\ (S_{11}^T + S_{12}^T)/4 & W_{31}^2(X) - W_{31}^2 & -S_{12}^T/2 \end{vmatrix} \qquad (13c)$$

$$E_c \equiv \frac{\rho_a}{D} \begin{vmatrix} Z_1 & Z_2 & W_L^2(X) - W_L^2 \\ S_{12}^T/2 & (S_{11}^T - S_{12}^T)/2 & W_{21}^2(X) - W_{21}^2 \\ (S_{11}^T + S_{12}^T)/4 & (S_{12}^T - S_{11}^T)/4 & W_{31}^2(X) - W_{31}^2 \end{vmatrix} \qquad (13d)$$

$$E_d \equiv \frac{\rho_a}{D} \begin{vmatrix} Z_0/\rho_a & Z_2 & Z_3 \\ 2S_{12}^T W_{21}^2 & (S_{11}^T - S_{12}^T)/2 & -S_{11}^T/2 \\ 2S_{11}^T W_{31}^2 & (S_{12}^T - S_{11}^T)/4 & -S_{12}^T/2 \end{vmatrix} \qquad (13e)$$

$$E_e \equiv \frac{\rho_a}{D} \begin{vmatrix} Z_1 & Z_0/\rho_a & Z_3 \\ S_{12}^T/2 & 2S_{12}^T W_{21}^2 & -S_{11}^T/2 \\ (S_{11}^T + S_{12}^T)/4 & 2S_{11}^T W_{31}^2 & -S_{12}^T/2 \end{vmatrix} \qquad (13f)$$

$$E_f \equiv \frac{\rho_a}{D} \begin{vmatrix} Z_1 & Z_2 & Z_0/\rho_a \\ S_{12}^T/2 & (S_{11}^T - S_{12}^T)/2 & 2S_{12}^T W_{21}^2 \\ (S_{11}^T + S_{12}^T)/4 & (S_{12}^T - S_{11}^T)/4 & 2S_{11}^T W_{31}^2 \end{vmatrix} \qquad (13g)$$

$$C_{111}{}^T = E_a/\tau_{33} - E_d,\ C_{123}{}^T = E_b/\tau_{33} - E_e,\ C_{123}{}^T = E_c/\tau_{33} - E_f \qquad (14)$$

Note that all the physical variables appearing in Eqs. 13a-13g can be obtained from the four measured quantities as aforementioned with the thermal variables that can found in the literature.

Using Eq. 4b, $S_{133}{}^T$ in Eq. 6a can be expressed for an isotropic solid in terms of $C_{\alpha\beta\gamma}{}^T$. Then, $$\eta_{11} = (\lambda_1{}^2 - 1)/2 = S_{12}{}^T\tau_{33} + S_{112}{}^T\tau_{33}/2 + \ldots = S_{12}{}^T\tau_{33} - (gC_{111}{}^T + hC_{112}{}^T + 2gC_{123}{}^T)\tau_{33}{}^2 + \ldots = (S_{12}{}^T - gE_a - hE_b - 2gE_c)\tau_{33} + (gE_d + hE_e + 2gE_f)\tau_{33}{}^2 + \ldots, \qquad (15)$$

where $$g = S_{12}{}^T(S_{11}{}^{T^2} + S_{12}{}^{T^2} + S_{11}{}^T S_{12}{}^T)/2,\ h \equiv (S_{11}{}^{T^3} + 3S_{11}{}^T S_{12}{}^{T^2} + 9 S_{11}{}^T S_{12}{}^{T^2} + 5 S_{12}{}^{T^3})/2. \qquad (16)$$

The last equation of Eq. 15 is a quadratic equation of $\tau_{33}$, which can be solved with measured $\lambda_1$ or $\eta_{11}$. When $\eta_{11}$ is positive under a compressive load, the negative root of $\tau_{33}$ is taken by convention. The positive root of $\tau_{33}$ is taken by convention for the case of $\eta_{11}$ being negative under a tensile load. $C_{111}{}^T$, $C_{112}{}^T$, and $C_{123}{}^T$ are then calculated via Eq. 14. $S_{333}{}^T = S_{111}{}^T$ for an isotropic solid is obtained using Eq. 4b. $S_{111}{}^T$ is expressed as $$S_{111}{}^T = -[(S_{11}{}^{T^3} + 2S_{12}{}^{T^3})C_{111}{}^T + 12gC_{112}{}^T + 6S_{11}{}^T S_{12}{}^{T^2}C_{123}{}^T]. \qquad (17)$$

Finally, using Eqs. 7 and 6b, one obtains the applied load P on the load-carrying member of the APLG as $$P = A_a \lambda_1^2 \sigma_{33} = A_a \lambda_3 \tau_{33} = A_a(1 + 2\eta_{33})^{1/2}\tau_{33} \qquad (18)$$
$$= A_a \tau_{33}(1 + \eta_{33} - \eta_{33}^2/2 + \ldots)$$
$$= A_a \tau_{33}[1 + S_{33}^T \tau_{33} + (S_{333}^T - S_{33}^{T2})\tau_{33}^2/2] + \ldots$$
$$= A_a \tau_{33}[1 + E(a)^{-1}\tau_{33} + (S_{333}^T - E(a)^{-2})\tau_{33}^2/2] + \ldots ,$$

where $A_a$ and E(a) are respectively the cross-sectional area and Young's modulus of the specimen at the zero load natural state. Note that for an isotropic solid, $S_{33}{}^T = S_{11}{}^T$, $S_{13}{}^T = S_{12}{}^T$, and $S_{333}{}^T = S_{111}{}^T$. (see Eqs. 6d)

Background Anisotropic and Isotropic Wave Modes

Regarding the launching, propagation and detection of three types of ultrasonic waves, longitudinal, fast shear and slow shear waves in elastic solids as discussed herein. The longitudinal waves propagate substantially faster than the shear waves. For a longitudinal wave, the direction of a particle vibration is very close to the direction of its propagation. For a shear wave, its direction of particle vibration is nearly perpendicular (or transverse) to the direction of propagation. Because of the shear wave vibration characteristics, shear wave is sometimes called "transverse wave".

The distinction between isotropic solids and anisotropic solids has significance with respect to the invention herein. The word "isotropic" means that in all directions inside the solids, physical properties including particular mechanical, acoustic, and electrical properties are the same. Longitudinal waves propagate at the same speed in every three dimensional direction inside the solids. Likewise for shear waves. In isotropic solids there exist only two distinctive ultrasonic waves that are longitudinal and shear waves. A longitudinal waves vibrates in the exactly same direction as its propagation. A shear wave vibrates exactly perpendicular to its propagation direction.

However, in anisotropic solids, physical properties are directionally dependent. Longitudinal and shear wave speeds depend on the direction of their propagation inside the anisotropic solids. Moreover, the shear waves launched into a solid from the attached transducer decompose into fast shear (fast transverse (FT)) and slow shear (slow transverse (ST)) waves, whose wave speeds are respectively directionally dependent. In other words, in the anisotropic solids, there exist three types of ultrasonic waves, one longitudinal and two shears which are FT and ST waves. Longitudinal waves vibrate close to their propagation direction and they are sometimes called quasi-longitudinal (QL). The FT and ST modes vibrates nearly perpendicular to their propagation direction and are called respectively quasi-FT (QFT) and quasi-ST (QST) waves. However, these three QL, QFT and QST waves vibrate mutually perpendicular to each other. In particular symmetry directions called pure mode directions of anisotropic solids, QL becomes a pure longitudinal wave whose vibration direction coincides with the propagation direction, and QFT and QST become respectively pure FT and pure QT, whose vibration direction is exactly perpendicular to the propagation direction.

Isotropic solids include amorphous glass materials, fused quartz, plastics such as nylon, flexi glass, polystyrene, etc. Many polycrystalline metals, such as aluminum, steel, stainless steel, and their alloys are nearly isotropic and they are usually treated as virtually isotropic materials. 7075 aluminum alloy I have used as an APLG load carrying member is such a case.

Anisotropic materials include single crystals of metals, ionic materials and semiconductors, etc. (001) oriented cubic silicon is a semiconductor single crystal. A hexagonal zinc single crystal is an anisotropic material which is having a transversely isotropic symmetry about its symmetry axis [0001]. These single crystals are anisotropic at stress-free zero load state.

Every physical property is stress-dependent. Longitudinal and shear wave speeds change as a function of stress. Isotropic materials at zero load stress-free state becomes anisotropic, which can be characterized as "slightly transversely isotropic but nearly isotropic" when they are loaded in a uniaxial vertical direction, just as in the APLG case. Induced anisotropy of initially isotropic materials are quite small. However, with up-to-date precision wave speed measurements we can detect anisotropy-induced small changes of longitudinal and shear wave speeds. Under the loaded state, pure transverse (shear) wave of initially isotropic solids decomposes into fast transverse (FT) and slow transverse (ST) modes, which propagate at slightly different wave speeds. In an APLG case under compressive loads, vertically polarized shear mode is pure FT mode and horizontally polarized shear mode is pure ST mode. Under tensile loads, the role reverses, i.e., vertically polarized shear mode is pure ST mode and horizontally polarized shear mode is pure FT mode.

Most of commercially available transducers are a contact-type planar thin-disk piezoelectric element, which activates either a longitudinal wave or a shear wave. When the longitudinal transducer is excited by a high-voltage electric signal, the generated longitudinal wave vibrates normal to the plane of thin piezoelectric disk and propagates into a contacted solid normal to the plane of the thin disk. A shear transducer vibrates in a particular direction (called polarization direction) parallel to the plane of the thin disk. The shear wave launched into an anisotropic material from the shear transducer decomposes into FT and ST waves, which propagate normal to the thin planar disk. The vibration (or polarization) direction of the shear transducer is indicated usually as the direction of high-voltage electrode into which high-voltage electric signals are fed. In our experiment we align the vibration (or polarization) direction of one shear transducer along the vertical loading direction, so that the shear transducer launches and detects only the vertically polarized FT mode. The vibration direction of the other shear transducer is aligned in the horizontal direction, so that it launches and detects only the horizontally polarized ST wave. The difference between FT and ST wave speeds in our experiment is so small that it is better to use two shear transducers, which separately detects FT and ST waves. However, for an anisotropic material such as a silicon crystal, the FT and ST modes propagate at substantially a different wave speed, and therefore one shear transducer whose polarization direction is aligned quite apart from either vertical or horizontal direction will distinctly detect both FT and ST waves that arrive at quite a different time. Thus with an anisotropic material used as an APLG load-carrying member, one needs one longitudinal and one shear transducers, which will somewhat simplify the task.

The noncontact EMAT (electromagnetic acoustic transducer) with single magnet and a pancake coil generates and detects three wave modes in a conducting anisotropic material. The physics of the generation and detection of the longitudinal, FT and ST modes are complicated and will not be elaborated here. Because it is non-contact and one transducer detects three modes of waves, it is ideally suited for an APLG construction.

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art; the invention should be construed to include everything within the scope of the appended claims and their equivalents.

I claim:

1. A method for precisely calculating an applied load directly in units of mass or force comprising the steps of:
 a. Providing
  i. a load carrying member (LCM) to which a load to be measured will be applied;
  ii. a digital acquisition load-calculating computer;
  iii. an ultrasonic transducer connected to the computer and positioned to generate ultrasonic waves into the LCM and receive reflected waves;
  iv. a linear displacement probe connected to the LCM;
 b. determining with respect to the LCM at zero load and at Reference Temperature:
  i. lateral dimension,
  ii. cross-sectional area,
  iii. the density of the load carrying member (LCM), and
  iv. recording the reference temperature;
 c. determining at zero load round trip times between opposite interior surfaces of the LCM of:
  i. a longitudinal ultrasound wave, a vertically polarized ultrasound shear wave and a horizontally polarized ultrasound shear waves, all propagating laterally in the direction perpendicular to the applied vertical loading direction by generating with the ultrasonic transducer a longitudinal ultrasound wave, a vertically polarized ultrasound shear wave and a horizontally polarized ultrasound shear waves, all propagating laterally in the direction perpendicular to the applied vertical loading direction;
  ii. recording ambient temperature and lateral dimensional change at which these round trip times are measured;
 d. determining with the load to be measured applied to the LCM the round trip times between opposite interior surfaces of the LCM of:
  i. a longitudinal ultrasound wave, a vertically polarized ultrasound shear wave and a horizontally polarized ultrasound shear waves, all propagating laterally in the direction perpendicular to the applied vertical loading direction by generating with the ultrasonic transducer a longitudinal ultrasound wave, a vertically polarized ultrasound shear wave and a horizontally polarized ultrasound shear waves, all propagating laterally in the direction perpendicular to the applied vertical loading direction;
  ii. recording
   a. ambient temperature; and
   b. determining lateral dimensional change at which these round trip times are measured with the linear displacement probe:

e. determining with the computer the applied load to be measured from equations derived from application of finite deformation theory, thermodynamics of finite deformation of elastic solids and nonlinear elastic equations of state of solids under uniaxial homogeneous loading and with the values determined at a., b., c. and d. above by:
   i. converting the adiabatic SOEC (second order elastic constants) and mixed TOEC (third order elastic constants) into isothermal values;
   ii. calculating thermodynamic stress $\tau_{33}$;
   iii. calculating the third order elastic constants;
   iv. calculating principal horizontal stretch $\lambda_1$ and principal vertical stretch $\lambda_3$;
   v. calculating Cauchy stress $\sigma_{33}$; and
   vi. calculating applied load P from the values derived at f. i., ii., iii, iv., and v. above.

2. A method for measuring enormous loads directly in units of mass or force comprising the steps of:
   a. Providing:
      i. a load-carrying member capable of carrying large loads without undergoing plastic deformation;
      ii. a digital acquisition load-calculating computer;
      iii. an ultrasonic transducer connected to the computer and positioned to generate ultrasonic waves into the LCM and receive reflected waves;
      iv. a linear displacement probe connected to the LCM
   b. taking the following readings while there is a zero load on the load-carrying member:
      i. recording an ambient temperature
      ii. measuring lateral dimensions of the load carrying member with the linear displacement probe;
      iii. measuring a round trip travel time of three types of ultrasound waves through an interior of the load carrying member between opposite lateral surfaces of the load carrying member by generating with the ultrasonic transducer a longitudinal ultrasound wave, a vertically polarized ultrasound shear wave and a horizontally polarized ultrasound shear waves, all propagating laterally in the direction perpendicular to the applied vertical loading direction;
   c. applying a load to be measured to the load carrying member and taking the following readings:
      i. measuring lateral dimensional changes of the load carrying member with the linear displacement probe;
      ii. measuring a round trip travel time of three types of ultrasound wave through an interior of the load carrying member between opposite lateral surfaces of the load carrying member by generating with the ultrasonic transducer a longitudinal ultrasound wave, a vertically polarized ultrasound shear wave and a horizontally polarized ultrasound shear waves, all propagating laterally in the direction perpendicular to the applied vertical loading direction;
   d. during steps b. and c. accounting for potential ambient temperature changes and;
   e. calculating with the computer a force or mass of the load with an Absolute Precision Load Gauge Algorithm (APLGA) with the measurements taken at b. and c. above.

3. The method of claim 2 wherein the step of accounting for potential ambient temperature changes is selected from a group consisting of a) maintaining the load carrying-member at a constant ambient temperature, and b) providing a zero reference member that is substantially the same as the load-carrying member and making said zero reference member subject to the same ambient temperature as the load-carrying member, keeping said zero reference member at a zero load at all time during the measuring process and subtracting dimensional changes of the zero reference member from that of the load-carrying member.

4. The method of claim 2 wherein the three types of ultrasound waves are: a vertically polarized ultrasound shear wave, a horizontally polarized ultrasound shear wave, and a longitudinal ultrasound wave.

5. The method of claim 2 wherein the step of calculating the load with the APLGA comprises:
   a. calculating $\tau_{33}$ thermodynamic stress; and calculating the load using $P=A_a\lambda_3\tau_{33}$ where $A_a$ is the cross sectional area of the load carrying member at zero load and $\lambda_3$ is the vertical stretch at applied load.

6. The method of claim 1 wherein the step of providing the LCM, comprises providing and LCM made from an isotropic solid at zero load with high acoustoelastic constant.

7. The method of claim 1 wherein the step of providing the LCM comprises the step of selecting the material the LCM is made from a group consisting of amorphous fused quartz, and aluminum alloy 7075.

8. The method of claim 1 wherein the step of providing the linear displacement probe is the step of providing a linear displacement probe with a displacement resolution of 50 nm.

9. The method of claim 2 wherein the step of providing the LCM, comprises providing and LCM made from an isotropic solid at zero load with high acoustoelastic constant.

10. The method of claim 2 wherein the step of providing the LCM comprises the step of selecting the material the LCM is made from a group consisting of amorphous fused quartz, and aluminum alloy 7075.

11. The method of claim 2 wherein the step of providing the linear displacement probe is the step of providing a linear displacement probe with a displacement resolution of 50 nm.

* * * * *